(12) United States Patent
Nishimura et al.

(10) Patent No.: US 7,394,470 B2
(45) Date of Patent: Jul. 1, 2008

(54) METHOD FOR REVERSIBLY TRANSFORMING DATA FORMAT, IMAGE PROCESSING APPARATUS, PROGRAM FOR REVERSIBLY TRANSFORMING DATA FORMAT, AND COMPUTER-READABLE RECORDING MEDIUM THEREOF

(75) Inventors: Takayuki Nishimura, Tottori (JP); Yasuyuki Nomizu, Kanagawa (JP); Hiroyuki Sakuyama, Tokyo (JP); Junichi Hara, Kanagawa (JP); Nekka Matsuura, Kanagawa (JP); Takanori Yano, Kanagawa (JP); Taku Kodama, Kanagawa (JP); Toshio Miyazawa, Kanagawa (JP); Yasuyuki Shinkai, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 63 days.

(21) Appl. No.: 10/763,708

(22) Filed: Jan. 22, 2004

(65) Prior Publication Data

US 2004/0201593 A1   Oct. 14, 2004

(30) Foreign Application Priority Data

Jan. 22, 2003   (JP)   ............................. 2003-013585
Jan. 21, 2004   (JP)   ............................. 2004-013138

(51) Int. Cl.
G09G 5/02   (2006.01)

(52) U.S. Cl. ..................... 345/604; 345/589; 345/591; 345/600; 345/603; 345/643; 345/644; 348/441; 348/661; 382/167

(58) Field of Classification Search ................. 345/605, 345/643, 644; 348/661
See application file for complete search history.

(56) References Cited

U.S. PATENT DOCUMENTS

| 5,519,439 | A | * | 5/1996 | Keith | .................... 375/240.01 |
| 5,664,080 | A | * | 9/1997 | Lucas et al. | .................. 345/593 |
| 6,044,172 | A | * | 3/2000 | Allen | ......................... 382/166 |
| 6,486,889 | B1 | * | 11/2002 | Meyers et al. | ............... 345/604 |

(Continued)

FOREIGN PATENT DOCUMENTS

JP   9-6952   1/1997

(Continued)

OTHER PUBLICATIONS

Poynton, Charles, "Frequently Asked Questions about Color." Mar. 1997. http://www.poynton.com/Poynton-color.html. (Date accessed Sep. 23, 2005).*

(Continued)

*Primary Examiner*—Kee M. Tung
*Assistant Examiner*—Antonio A Caschera
(74) *Attorney, Agent, or Firm*—Blakely, Sokoloff, Taylor & Zafman LLP

(57) ABSTRACT

In a method for reversibly transforming a data format, a forward transformation and a backward transformation are reciprocally conducted for data between unit systems having different resolution levels, and the forward transformation and the backward transformation, a first unit system having a lower resolution level is used as a common unit system, and a reversible data conversion is conducted by an integer operation for data in the first unit system having the lower resolution level and data in a second unit system having a higher resolution level higher than the first unit system.

19 Claims, 6 Drawing Sheets

U.S. PATENT DOCUMENTS 6,778,187 B1 * 8/2004 Yi ................ 345/605
6,934,411 B2 * 8/2005 Bezryadin ............ 382/162

FOREIGN PATENT DOCUMENTS

| JP | 11-219428 | 8/1999 |
|---|---|---|
| JP | 2000-175061 | 6/2000 |
| JP | 2000-017855 | 7/2001 |
| JP | 2000-018795 | 8/2001 |
| JP | 2000-124890 | 11/2001 |

OTHER PUBLICATIONS

"Learn TI-83 Assembly In 28 Days," McLaughlin, Sean, http://nwps.ws/~dragonfire/Asmin28/, © 2002, "Week 2: Day 9: Bit Shifting," date accessed: Apr. 1, 2006.*

* cited by examiner

FIG.5

[DIGITAL TYPE COLOR CONVERSION USING ITU-R BT.601]

[ORIGINAL DATA]

| R | 104 |
|---|---|
| G | 112 |
| B | 134 |

← DEVELOP RESULTS OF AUTOMATIC CONVERSION TO DOWN WHEN INPUT VALUE FROM 0 TO 255
← DEVELOP RESULTS OF AUTOMATIC CONVERSION TO DOWN WHEN INPUT VALUE FROM 0 TO 255
← DEVELOP RESULTS OF AUTOMATIC CONVERSION TO DOWN WHEN INPUT VALUE FROM 0 TO 255

| Y | 112 |
|---|---|
| Cb | 139 |
| Cr | 123 |

RESTORE

| R' | 105 |
|---|---|
| G' | 112 |
| B' | 131 |

| Y' | 112 |
|---|---|
| Cb' | 139 |
| Cr' | 123 |

RESTORE

| R' | 105 |
|---|---|
| G' | 112 |
| B' | 131 |

[REVERSIBLE TRANSFORMATION OF Y/Cb/Cr → R/G/B FOR MLC]

METHOD FOR REVERSIBLY TRANSFORMING DATA FORMAT, IMAGE PROCESSING APPARATUS, PROGRAM FOR REVERSIBLY TRANSFORMING DATA FORMAT, AND COMPUTER-READABLE RECORDING MEDIUM THEREOF

The present application is based on the Japanese Priority Applications No. 2003-013586 filed on Jan. 22, 2003 and No. 2004-13138 filed on Jan. 21, 2004, the entire contents of which are hereby incorporated by reference.

BACKGROUND OF TEE INVENTION

1. Field of the Invention

The present invention generally relates to a transforming process for transforming a format of image data, and in particular, a method for reversibly transforming data format, an image processing apparatus, a program for reversibly transforming data format, and a computer-readable recording medium thereof, in which a color space transforming process is conducted in a system where a lossless/lossy compression/extraction is conducted with respect to the image data in a color space.

2. Description of the Related Art

A color space is one of areas in a vector space that is a three dimensions or higher dimensions. For example, a color coordinate system is defined by three dimensional vectors being three linear independences as bases. In the color coordinated that is generally used, each of R (Red), G (Green), and B (Black) are defined by a central wavelength. When a certain three dimensional color coordinate system is given, any three dimensional linear color coordinate other than the certain three dimensional color coordinate can be expressed by a reversible 3×3 matrix (non-singular).

In practice, various color coordinates (color spaces) are defined by various reasons. For example, in a case of displaying data at a monitor, a RGB coordinate system is used in almost all digital color images. For example, a fixed range being 8 bits/coordinate is preferable. In a case of a compression requiring a color noncorrelativity, the RGB coordinate system is not suitable but another color coordinate system such as a YIQ coordinate system is more suitable. Also, a YUV coordinate system and a YCrCb coordinate system are suitable. Regarding a separation between a brightness and a chrominance relating to a luminosity, these opponent color coordinates systems attempt to improve a separation of a characteristic and an appearance of a change of the chrominance in the same brightness.

In addition, in image for a print, a subtractive color system such as a CMY (Cyan, Magenta, and Yellow) is used. Alternatively, a perfect four dimensional space such as a CMYK (Cyan, Magenta, Yellow, and Black) is used.

The data compression is extremely useful to store and transmit a large amount of data. For example, a necessary time to transmit image data such as a facsimile transmission of a document can be significantly reduced by compressing the image data and reducing the number of bits necessary to reproduce an image.

Conventionally, there are various data compressing methods. The compressing methods can be classified into two categories: that is, a lossy coding and a lossless coding. In the lossy coding, loss of image data maybe occur. Accordingly, an original image can not be guaranteed to be produced perfectly. An purpose of the lossy compression is to prevent a change caused by reproducing the image data from being unpleasant and conspicuous. In the lossless compression, all the image data are stored and compressed in a state in that the image data can be perfectly reproduced.

In the lossless compression, an input symbol or brightness data are converted into an output code word. As input data, image data, voice data, one dimensional data (for example, data changing temporally), two dimensional data (for example, data changing to two space axis directions), and multi-dimensional/multi-spectrum data are used. When data are successfully compressed, the code words of the compressed data are expressed by the number of bits fewer than the number of bits of the input symbol (or the brightness data). As the lossless coding method, a dictionary coding method (for example, Lempel-Ziv coding method), a run length coding method, an arithmetic coding method, and an entropy coding method are used. In a case of the lossless image compression, the basic of the compression is a prediction, a context, and a coding. A JBIG standard for a facsimile compression and a DPCM (Difference Pulse Coding Modulation that is an option of a JPEG standard) for a continuous-tone image are examples of the lossless compression for the image. In the lossy compression, the input symbol and the brightness data are converted into output code words after quantized. Purposes of the quantization is to store characteristic data being important portions of data and also to eliminate unimportant data. In the lossy compression, a conversion for an energy concentration is utilized before the quantization. A base line JPEG is one example of the lossy coding method for the image data.

Conventionally, a color coordinate transformation has been utilized for the lossless compression with the quantization. In the lossless compressing system or the lossless/lossy compressing system, a main essential requirement is reversibility and effectiveness of a transformation. In other lossless/lossy compressing systems, a non-correlation of colors is one factor other than the effectiveness of a reversible transformation. For example, the 3×3 matrix is used for the lossy compression only. Because factors are not integers, when the non-correlation is required, errors are involved in a process while data is alternately compressed and extended.

When the color space is transformed, a calculation accuracy becomes a problem. For example, when 8 bits are input, 10 or 11 bits are required to transform the color space. Higher accuracy is required for an internal calculation, so that a stable color space can be obtained. Errors are accumulated in a result after an image is converted and compressed from the RGB color space and then extended to restore the image in the RGB color space even if a sufficient accuracy is applied to processes being repeated. Accordingly, a final color does not match the same as an original color. This is called color shift that occurs since the color space is unstable.

Methods are provided to realize a reversible color space transformation by an integer operation having predictable accuracy (for example, refer to IDS or Cross-References 1 and 2).

A color converting method for converting into a full color image at higher speed and lower cost after the image is compressed in a JPEG format is disclosed (for example, refer to IDS or Cross-Reference 3). In this color converting method, the input color image is separated into a brightness element and a chrominance element, a color conversion number is obtained by using the chrominance element in which the brightness element is input and an output color space value output, a color conversion is conducted by applying the brightness element to a color converting function, and then an input color in a given color space is converted into an output color in another color space.

The IDS or Cross-References 1 and 2 discloses the reversible color conversion by the integer operation, in the reversible color conversion, an error is not accumulated even if a conversion and a reversed conversion are repeated, and then the color conversion is reversibly conducted at a predictable accuracy. Therefore, it is just a simple data conversion.

Moreover, in a case of IDS or Cross-References 3, the color converting process can be conducted at high speed, and an operation amount and cost can be reduced in the color converting process. Accordingly, a conversion accuracy can not be improved.

That is, in JPEG and JPEG 2000, as describe above, an image subject to be compressed is processed by YCbCr (Y:brightness, Cb:Black color difference, Cr:Red color difference) data. In addition, in generally, the image display and a print developing process are processed by RGB and YMC (or YMCK). Accordingly, compatibility for both RGB and YMC can be problem. In particular, in JPEG 2000, when the electronic watermark for preventing form manipulaton and the electronic watermark for encryption are embodied, it is required to loss any data even if the conversion and the reversible conversion are conducted, and maintain the compatibility of image data conversion. In particular, in JPEG 2000 where lessless compression and extension are available, RGB and YCbCr color conversion is a not-reversible conversion. It is retired for a basic color conversion disclosed in IDS or Cross-References 1 and 2 to guarantee the image quality.

In addition, not only the conversion for the color space, a problem concerning a length conversion of the image data can be raised. For example, in general, data in a personal computer is process in a mm unit system but data in a printer is processed in a inch unit system. Accordingly, if the reversibility in the conversion and the reversed conversion is displaced, a page location may be displaced.

[IDS or Cross-Reference 1]
Japanese Laid-Open Patent Application No. 9-6952
[IDS or Cross-Reference 2]
Japanese Laid-Open Patent Application No. 11-219428
[IDS or Cross-Reference 3]
Japanese Laid-Open Patent Application No. 2000-175061

SUMMARY OF THE INVENTION

It is a general object of the present invention to provide a method for reversibly transforming data format, an image processing apparatus, a program for reversibly transforming data format, and a computer-readable recording medium thereof, in which the above-mentioned problems are eliminated.

A more specific object of the present invention is to provide a a method for reversibly transforming data format, an image processing apparatus, a program for reversibly transforming data format, and a computer-readable recording medium thereof, in which a color space transforming process is conducted in a system where a lossless/lossy compression/extraction is conducted with respect to the image data in a color space.

The above objects of the present invention are achieved by a method for reversibly converting a data format in that a forward transformation and a backward transformation are reciprocally conducted for data between unit systems having different resolution levels, wherein in the forward transformation and the backward transformation, a first unit system having a lower resolution level is used as a common unit system, and a reversible data conversion is conducted by an integer operation for data in the first unit system having the lower resolution level and data in a second unit system having a higher resolution level higher than the first unit system.

In the method, the first unit system is a first color space having the lower resolution level, and the second unit system is a second color space having the higher resolution level, wherein in a case in that a digital color conversion by quantizing the first color space having the lower resolution level and being analog, by using the first color space as the common unit system, the reversible data conversion is conducted by the integer operation, so that the backward transformation from first data in the first color space to second data in the second color space and the forward transformation from the second data in the second color space to third data in the first color space are conducted and the first data corresponds to the third data.

In the method, the first data in the first color space are YCbCr data, and the second data in the second color space are RGB data, and the third data in the first color space are Y'Cb'Cr', and in a case of converting to the Y'Cb'Cr' data after the YCbCr data is converted into the RGB data, when the forward transformation is conducted from the RGB data to the Y'Cb'CR' data, a first formula is conducted by an integer operation of a color converting functions where the first formula is defined as $$Y = \left\lfloor \frac{219 \times (299 \times R + 587 \times G + 114 \times B) + 16 \times 255 \times 1000 + 255 \times 1000/2}{255 \times 1000} \right\rfloor \divideontimes$$

$$Cb = \left\lfloor \frac{224 \times 564 \times (-229 \times R - 587 \times G + 886 \times B) + 128 \times 225 \times 1000 \times 1000 + 255 \times 1000 \times 1000/2}{255 \times 1000 \times 1000} \right\rfloor$$

$$Cr = \left\lfloor \frac{224 \times 713 \times (701 \times R - 587 \times G - 114 \times B) + 128 \times 225 \times 1000 \times 1000 + 255 \times 1000 \times 1000/2}{255 \times 1000 \times 1000} \right\rfloor$$

$\divideontimes \lfloor \ \rfloor$: round a fractional part and the same in the following and when the backward transformation is conducted from the RGB data to the YCbCr data, a second formula is conducted by an integer operation of a color converting functions where the second formula is defined as $$R = \left\lfloor \frac{[219 \times 1000 \times (Cr - 128) + 713 \times 224 \times (Y - 16)] \times 255 + 713 \times 224 \times 219/2}{713 \times 224 \times 219} \right\rfloor$$

$$G = \left\lfloor \frac{\begin{bmatrix} 713 \times 224 \times 587 \times 564(Y - 16) - \\ 229 \times 219 \times 564 \times 1000 \times (Cr - 128) - \\ 114 \times 219 \times 713 \times 1000 \times (Cb - 128) \end{bmatrix} \times 255 + 219 \times 713 \times 224 \times 587 \times 564/2}{219 \times 713 \times 224 \times 587 \times 564} \right\rfloor$$

$$B = \left\lfloor \frac{[219 \times 1000 \times (Cb - 128) + 564 \times 224 \times (Y - 16)] \times 255 + 564 \times 224 \times 219/2}{564 \times 224 \times 219} \right\rfloor$$

In the method, the first unit system is a first color space having the lower resolution level and the second unit system is a second color space having the higher resolution level, wherein in a case in that a digital color conversion by quantizing the first color space having the lower resolution level and being analog, by using the first color space as the common unit system, the reversible data conversion is conducted by the integer operation, so that the backward transformation from first data in the first color space to second data in the second color space and the forward transformation from the second data in the second color space to third data in the first color space are conducted and the first data corresponds to the third data.

In the method, the first data in the first color space are YCbCr data, and the second data in the second color space are RGB data, and the third data in the first color space are Y'Cb'Cr', and in a case of converting to the Y'Cb'Cr' data after the YCbCr data is converted into the RGB data, the forward transformation from the second data in the second color space to the third data in the first color space is conducted by an integer operation where MAX denotes a maximum value of the resolution level and Y, M, and C are set to be Y=MAX−B, M=MAX−G, and C=MAX−R in the first formula, and the backward transformation from the first data in the first color space to the second data in the second color space is conducted by an integer operation where MAX denotes a maximum value of the resolution level and Y, M, and C are set to be Y=MAX−B, M=MAX−G, and C=MAX−R in the second formula.

In the method, the first unit system is a first color space having the lower resolution level and the second unit system is a second color space having the higher resolution level, wherein in a case of conducing a color conversion in accordance with an international standard in which the data format for converting an analog video signal into digital data is specified, by using the first color space as the common unit system, the reversible data conversion is conducted by the integer operation, so that the backward transformation from first data in the first color space to second data in the second color space and the forward transformation from the second data in the second color space to third data in the first color space are conducted and the first data corresponds to the third data.

In the method, the first data in the first color space are YCbCr data, and the second data in the second color space are quantized R(d)G(d)B(d) data, and the third data in the first color space are Y'Cb'Cr', and in a case of converting to the Y'Cb'Cr' data after the YCbCr data is converted into the RGB data, in a conversion from an analog R(a)G(a)B(a) data to the YCbCr data, the forward transformation from the YCbCr data by conducting a color converting function in a third formula defined as $$Y = \left\lfloor \frac{219 \times (77 \times R(a) + 150 \times G(a) + 29 \times B(a)) + 16 \times 256 \times 256 + 256 \times 128}{256 \times 256} \right\rfloor$$

$$Cb = \left\lfloor \frac{219 \times (-44 \times R(a) - 87 \times G(a) + 131 \times B(a)) + 128 \times 256 \times 256 + 256 \times 128}{256 \times 256} \right\rfloor$$

$$Cr = \left\lfloor \frac{219 \times (131 \times R(a) - 110 \times G(a) - 21 \times B(a)) + 128 \times 256 \times 256 + 256 \times 128}{256 \times 256} \right\rfloor$$

to the R(d)G(d)B(d) data is conducted by an integer operation of a color converting function in a fourth formula defined as $$R(d) = \left\lfloor \frac{(16772821 \times Y + 22904709 \times Cr - 41320 \times Cb - 2926513792) \times 2 + 16772821}{16772821 \times 2} \right\rfloor$$

-continued $$G(d) = \left\lfloor \frac{(470873 \times Y - 329527 \times Cr - 157064 \times Cb + 62283648) \times 2 + 470873}{470873 \times 2} \right\rfloor$$

$$B(d) = \left\lfloor \frac{(16772821 \times Y - 102267 \times Cr + 29047960 \times Cb - 3705048704) \times 2 + 16772821}{16772821 \times 2} \right\rfloor$$

and when the backward transformation is conducted from the R(d)G(d)B(d) data to the Y'Cb'Cr' data, a fifth formula is conducted by an integer operation of a color converting functions where the second formula is defined as $$Y' = \left\lfloor \frac{77 \times R(d) + 150 \times G(d) + 29 \times B(d) + 128}{256} \right\rfloor$$

$$Cb' = \left\lfloor \frac{-44 \times R(d) - 87 \times G(d) + 131 \times B(d) + 128 \times 256 + 128}{256} \right\rfloor$$

$$Cr' = \left\lfloor \frac{131 \times R(d) - 110 \times G(d) - 21 \times B(d) + 128 \times 256 + 128}{256} \right\rfloor$$

In the method, the first unit system is a first color space having the lower resolution level, and the second unit system is a second color space having the higher resolution level, wherein in a case of conducting an original color based on the brightness and the color difference, by using the first color space as the common unit system, the reversible data conversion is conducted by the integer operation, so that the backward transformation from first data in the first color space to second data in the second color space and the forward transformation from the second data in the second color space to third data in the first color space are conducted and the first data corresponds to the third data.

In the method, the first data in the first color space are Y(o)Cb(o)Cr(o) data, and the second data in the second color space are R(o)G(o)B(o) data, and the third data in the first color space are Y(o)'Cb(o)'Cr(o)', and in a case of converting to the Y(o)'Cb(o)'Cr(o)' data after the Y(o)Cb(o)Cr(o) data is converted into the R(o)G(o)B(o) data, when the forward transformation is conducted from the RGB data to the Y(o)'Cb(o)'CR(o)' data, a sixth formula is conducted by an integer operation of a color converting functions where the sixth formula is defined as $$Y(o) = \left\lfloor \frac{2 \times (x_M \times R(o) + (D - x_M - y_M) \times G(o) + y_M \times B(o)) + D}{2 \times D} \right\rfloor$$

$$Cb(o) = \left\lfloor \frac{\left\lfloor \frac{MAX_{RGB} + 1}{2} \right\rfloor \times 2 \times (D - y_M) - x_M \times R(o) - (D - x_M - y_M) \times G(o) + (D - y_M) \times (B(o) - 1)}{2 \times (D - y_M)} \right\rfloor - \left\lfloor \frac{MAX_{RGB} + 1}{2} \right\rfloor$$

$$Cr(o) = \left\lfloor \frac{\left\lfloor \frac{MAX_{RGB} + 1}{2} \right\rfloor \times 2 \times (D - x_M) + (D - x_M) \times (R(o) + 1) - (D - x_M - y_M) \times G(o) - y_M \times B(o)}{2 \times (D - x_M)} \right\rfloor - \left\lfloor \frac{MAX_{RGB} + 1}{2} \right\rfloor$$

and when the backward transformation is conducted from the R(o)G(o)B(o) data to the Y(o)Cb(o)Cr(o) data, a seventh formula is conducted by an integer operation of a color converting functions where the seventh formula in defined as $$R(o) = \left\lfloor \frac{2 \times (D \times Y(o) + 2 \times (D - x_M) \times Cr(o)) + D}{2 \times D} \right\rfloor$$

$$G(o) = \left\lfloor \frac{\begin{array}{c}(2 \times ((D - x_M - y_M) \times D \times Y(o) - 2 \times y_M \times (D - y_M) \times \\ Cb(o) - 2 \times x_M \times (D - x_M) \times Cr(o)) + (D - x_M - y_M) \times D)\end{array}}{2 \times (D - x_M - y_M) \times D} \right\rfloor$$

$$B(o) = \left\lfloor \frac{2 \times (D \times Y(o) + 2 \times (D - y_M) \times Cb(o)) + D}{2 \times D} \right\rfloor$$

In the method as claimed in claim 9, wherein a color conversion for the original color based on the brightness and the color difference, the first data in the first color space are Y(o)Cb(o)Cr(o) data, and the second data in the second color space are R(o)G(o)B(o) data, and the third data in the first color space are Y(o)'Cb(o)'Cr(o)', and in a case of converting to the Y(o)'Cb(o)'Cr(o)' data after the Y(o)Cb(o)Cr(o) data is converted into the R(o)G(o)B(o) data, when the forward transformation is conducted from the RGB data to the Y(o) 'Cb(o)'CR(o)' data, an eighth formula is conducted by an integer operation of a color converting functions where the eighth formula is defined as $$Y(o) = \left\lfloor \frac{(299 \times R(o) + 587 \times G(o) + 114 \times B(o)) + 500}{1000} \right\rfloor$$

$$Cb(o) = \left\lfloor \frac{\begin{array}{c}128 \times 2 \times 886 - 229 \times R(o) - \\ 587 \times G(o) + 886 \times (B(o) + 1)\end{array}}{2 \times 886} \right\rfloor - 128$$

$$Cr(o) = \left\lfloor \frac{\begin{array}{c}128 \times 2 \times 701 + 701 \times (R(o) + 1) - \\ 587 \times G(o) - 114 \times B(o)\end{array}}{2 \times 701} \right\rfloor - 128$$

and when the backward transformation is conducted from the R(o)G(o)B(o) data to the Y(o)Cb(o)Cr(o) data, a ninth formula is conducted by an integer operation of a color converting functions where the ninth formula is defined as $$R(o) = \left\lfloor \frac{(1000 \times Y(o) + 1402 \times Cr(o)) + 500}{1000} \right\rfloor$$

$$G(o) = \left\lfloor \frac{\begin{array}{c}(587 \times 1000 \times Y(o) - 2 \times 114 \times 886 \times Cb(o) - \\ 2 \times 299 \times 701 \times Cr(o)) + 587 \times 500\end{array}}{587 \times 1000} \right\rfloor$$

$$B(o) = \left\lfloor \frac{(1000 \times Y(o) + 1772 \times Cb(o)) + 500}{1000} \right\rfloor$$

In the method, maximum values and minimum value are limited in available ranges for the R(o)G(o)B(o) data and the Y(o)Cb(o)Cr(o) data.

In the method, wherein the first unit system is a BMU unit system using an inch unit system and the second unit system is a 1/100 mm unit system using a meter unit system, and by using the first color space as the common unit system, the reversible data conversion is conducted by the integer operation, so that the backward transformation from first data in the first color space to second data in the second color space and the forward transformation from the second data in the second color space to third data in the first color space are conducted and the first data corresponds to the third data.

In the method, after the first data shown in the BMU unit system is converted into the second data shown in the 1/100 mm using the meter unit system, a tenth formula is conducted to convert to the third data showing the BMU unit system where the tenth formula is defined as <1/100 mm data>=⌊(2540×<BMU data>+600)/1200⌋

<BMU data>=⌊(1200×<1/100 mm data>+1270)/2540⌋.

In the method, the integer operation conducts the reversible conversion using powers of 2.

In the method, the forward transformation from the R(o)G(o)B(o) data to the Y(o)'Cb(o)'Cr(o)' data is conducted by an eleventh formula using powers of 2 derived from the sixth formula where the eleventh formula is defined as $$Y(o) = \left\lfloor \frac{\begin{array}{c}(128 \times 2^{12}) + 1225 \times R(o) + 2404 \times \\ G(o) + 467 \times B(o) + 2^{11}\end{array}}{2^{12}} \right\rfloor - 128$$

$$Cb(o) = \left\lfloor \frac{\begin{array}{c}(128 \times 2^{12}) - 691 \times R(o) - 1357 \times \\ G(o) + 2^{11} \times B(o) + 2^{11}\end{array}}{2^{12}} \right\rfloor - 128$$

$$Cr(o) = \left\lfloor \frac{\begin{array}{c}(128 \times 2^{12}) - 2^{11} \times R(o) - 1715 \times \\ G(o) - 333 \times B(o) + 2^{11}\end{array}}{2^{12}} \right\rfloor - 128$$

and the backward transformation from the Y(o)Cb(o)Cr(o) data to the R(o)G(o)B(o) data in conducted by a twelfth formula using powers of 2 derived from the seventh formula where the twelfth formula is defined as $$R(o) = \left\lfloor \frac{(128 \times 2^{12}) + 2^{12} \times Y(o) + 5743 \times Cr(o) + 2^{11}}{2^{12}} \right\rfloor - 128$$

$$G(o) = \left\lfloor \frac{\begin{array}{c}(128 \times 2^{12}) + 2^{12} \times Y(o) - 1410 \times \\ Cb(o) - 2925 \times Cr(o) + 2^{11}\end{array}}{2^{12}} \right\rfloor - 128$$

$$B(o) = \left\lfloor \frac{(128 \times 2^{12}) + 2^{12} \times Y(o) + 7258 \times Cb(o) + 2^{11}}{2^{12}} \right\rfloor - 128$$

In the method, the powers of 2 is conducted by bit shifts.

In the method, the forward transformation from the R(o)G(o)B(o) data to the Y(o)'Cb(o)'Cr(o)' data is conducted by a thirteenth formula using powers of 2 derived from the sixth formula where the thirteenth formula is defined as $Y(o)=(((128<<12)+1225 \times R(o)+2404 \times G(o)+467 \times B(o)+(1<<11))>>12)-128;$ $Cb(o)=(((128<<12)-691 \times R(o)-1357 \times G(o)+2048 \times B(o)+(1<<11))>>12)-128;$ $Cr(o)=(((128<<12)+2048 \times R(o)-1715 \times G(o)-333 \times B(o)+(1<<11))>>12)-128;$ and the backward transformation from the Y(o)Cb(o)Cr(o) data to the R(o)G(o)B(o) data is conducted by a fourteenth formula using powers of 2 derived from the seventh formula where the fourteenth formula is defined as $$R(o)=(((128<<12)+4096\times Y(o)+5743\times Cr(o)+(1<<11))>>12)-128;$$

$$G(o)=(((128<<12)+4096\times Y(o)-1410\times Cb(o)-2925\times Cr(o)+(1<<11))>>12)-128;$$

$$B(o)=(((128<<12)+4096\times Y(o)+7258\times Cb(o)+(1<<11))>>12)-128;$$

According to the present invention, in the forward transformation and the backward transformation, a unit system having a lower resolution revel is used as the common unit system and the data conversion is conducted by the integer operation between unit systems having different resolution levels, by using the common unit system. Therefore, a unit system having a higher resolution level is sufficiently processed and then it is possible to realize the reversible conversion where data can be perfectly restored.

In particular, regarding the digital color conversion using a quantization of analog Y, Cb, Cr signals between the unit system for the color space RGB and the unit system for the color space YCbCr, the unit system for the color space YCbCr having a lower resolution level is used as the common unit system. Thus, since the unit system for the color space RGB is sufficiently processed, it is possible to realize the reversible conversion in a color space where data can be perfectly restored.

Moreover, it is possible to realize the reversible conversion in the color space where data can be perfectly restored by a predetermined color converting function.

Furthermore, in a case in that a unit system for a print in such as a color space YMC is used, it is possible to realize the reversible conversion in the color space where data can be perfectly restored.

In particular, regarding the color conversion in accordance with the international standard specifying a data format for converting an analog video signal into the digital data between the unit system in the color space RGB and the unit system in the color space YCbCr, the color space YCbCr having a lower resolution level is used as the common unit system. Therefore, since the unit system in the color space RGB having a higher resolution level can be sufficiently processed, it is possible to realize the reversible conversion of the color space where data can be perfectly restored.

In particular, regarding the color conversion of the original color based on the brightness and the color difference between the unit system in the color space RGB and the unit system in the color space YCbCr, the color space YCbCr having a lower resolution level is used as the common unit system. Therefore, since the color space RGB having a higher resolution level can be sufficiently processed, it is possible to realize the reversible conversion in the color space where data can be perfectly restored.

Moreover, in the available ranges for R(o)G(o)B(o) data and Y(o)Cb(o)Cr(o) data, a limited range is provided in that a maximum value and a minimum value are limited. Therefore, without being out of the range of the color converting function, it is possible to conduct the compatible conversion where data can be perfectly restored.

In particular, regarding the length conversion between the BMU type data using an inch unit system and the 1/100 mm type data using a meter unit system in the personal computer and the printer, the inch unit system for the BMU type data having a lower resolution level is used as the common unit system. Therefore, since the meter unit system for the 1/100 mm type data having a higher resolution level can be sufficiently processed, it is possible to realize the reversible conversion where length data can be perfectly restored.

The above objects of the present invention can be achieved by an image processing apparatus that realizes the process in the method for reversibly transforming data format, by a program code for causing a computer to conduct processes described above in the method or by a computer-readable recording medium recorded with the program code. The image processing apparatus is not limited to a single function device such as a digital camera, a digital copier, and an MFP (Multi-Functional Printer). Alternatively, the image processing apparatus can have a system configuration of a server/client system or a like.

BRIEF DESCRIPTION OF THE DRAWINGS

In the following, embodiments of the present invention will be described with reference to the accompanying drawings.

FIG. 5 is a diagram schematically illustrating results of a digital type color conversion.

DESCRIPTION OF THE PREFERRED EMBODIMENT

In the following, an embodiment of the present invention according to a document processing apparatus will be described with reference to the accompanying drawings. The present invention can be applied to various image processing systems and devices such an a color television broadcast, a digital video, a digital camera, a digital copier, an MFP (Multi-Functional Printer), various image processing application software for a personal computer, a printer, a scanner, and a like. For the sake of convenience, just the most essential part of the present invention is explained and shown in the accompanying drawings regarding the various image processing systems and image processing devices. In addition, a data format reversible converting method according to the present invention can be realized by a program which can be executable in these various image processing system and image processing devices, and various computer-readable recording media recording the program.

[System Configuration]

Figure 1:
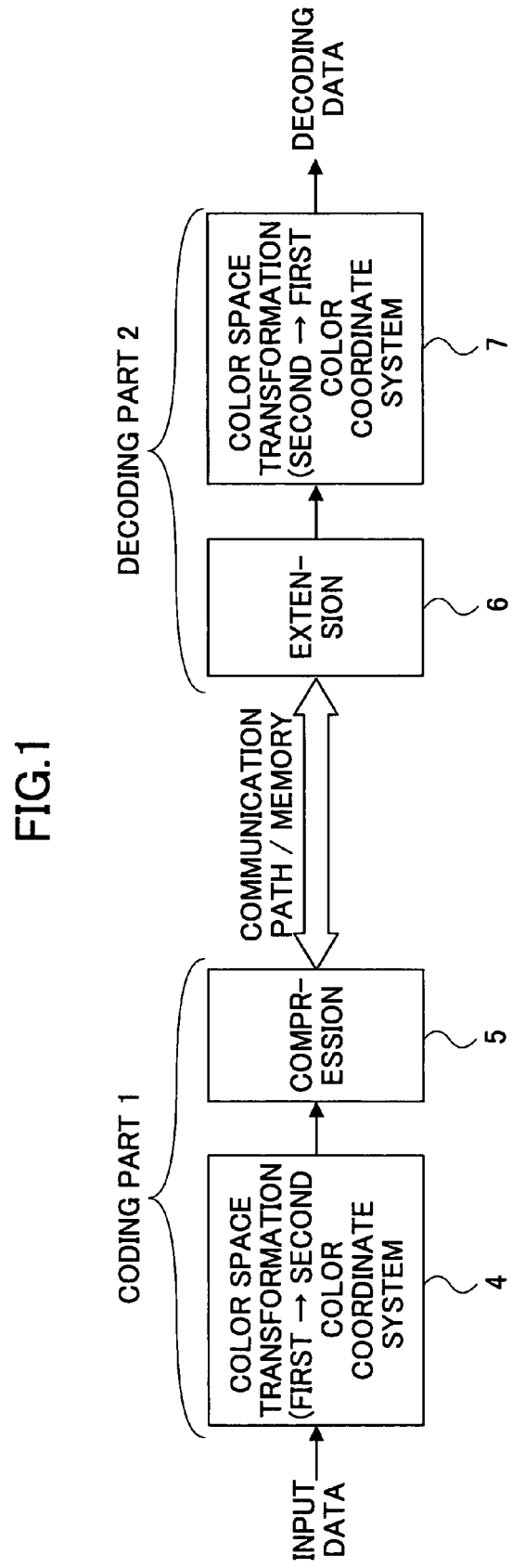
FIG. 1 is a diagram schematically showing a system configuration according to an embodiment of the present invention.

The present invention can be included in a compressing/extending system having a coding part and a decoding part that are provided to the image processing apparatus (any one of the various image processing system and image processing devices). FIG. 1 illustrates a system configuration according to the present invention. A coding part 1 encodes input data to generate compressed data (encoded data), and a decoding part 2 decodes the encoded data to generate original input data. In the coding part 1, a color space transformation 4 is conducted to convert a first color coordinate system into a second color coordinate system prior to a compression 5. Similarly, in the decoding part 2, a color space transformation 7 is conducted from the second coordinate system to the first coordinate system after an extension 6.

The input data for the compressing/expressing system may be an image (static image or dynamic image), graphics data, and data in other various data formats. In this case, the input data is digital signal data. Alternatively, data in other formats can be the input data. A source of the data may be based on a communication path or a memory for the coding part 1 and/or the decoding part 2. This system can be configured as a lossless compressing/extending system or to conduct a lossy compression/extension.

In addition, as described above, configuration factors of the coding part 1 and/or the decoding part 2 may be realized by hardware, software, or a combination of both hardware and software. The color space transformations 4 and 7 are realized as a data format lossless transforming part or that function, as follows.

[Application for Analog Type Compatible Color Transformation]

An example of an application to a digital color transformation by quantizing analog Y, Cb, and Cr signals (Y:brightness, Cb:B (Black) color difference, and Cr:R (Red) color difference) will be described according to an embodiment of the present invention. In this case, regarding the digital color transformation by quantizing the analog Y, Cb, and Cr signals between an unit system in a color space RGB and an unit system in a color space YCbCr, the unit system of the color space YCbCr having a lower resolution is used as a common unit system to maintain a compatibility of an integer operation with the color space RGB. That is, between the unit system of the color space YCbCr having a lower resolution and the unit system of the color space RGB used for a display by using the unit system of the color space YCbCr, the following data conversion is conducted in an order of a backward transformation and a forward transformation:

YCbCr data->RGB data->Y'Cb'Cr data.

The data conversion is reversibly conducted by the integer operation so as to satisfy Y=Y', Cb=Cb', and Cr=Cr'. The inventors found a color converting function for conducting the forward transformation and another color converting function for conducting the backward transformation in the data conversion for conducting the backward transformation and the forward transformation to realize a YCbCr data->RGB data->Y'Cb'Cr data conversion. It should be noted that each of R, G, and B element values used in the embodiment is independent from each other and is one of values from 2 to 253 (expressed in 8 bits).

First, as an RGB data->YCbCr data conversion, the following color converting function can be applied to a digital color converting function quantizing the analog Y, Cb, and Cr signals cited in ITU-R BT.601 being an international standard that specifies a data format when an analog video signal specified for the color television broadcast or the like is converted into a digital data. Regarding the digital color converting function, a converting process is conventionally conducted by a real number operation shown in the following formula 15:

$$Y = 219 \times \left[ 0.299 \times \frac{R}{255} + 0.587 \times \frac{G}{255} + 0.114 \times \frac{B}{255} \right] + 16$$

$$Cb = 224 \times \left[ 0.564 \times \left( -0.299 \times \frac{R}{255} - 0.587 \times \frac{G}{255} + 0.886 \times \frac{B}{255} \right) \right] + 128$$

$$Cr = 224 \times \left[ 0.713 \times \left( 0.701 \times \frac{R}{255} - 0.587 \times \frac{G}{255} - 0.114 \times \frac{B}{255} \right) \right] + 128$$

[Formula 15]

However, when the formula 15 is calculated by a computer, errors occur due to an overflow of an arithmetic operation. On the contrary, in this embodiment, for the RGB data->YCbCr data conversion, instead of using the formula 15, the following formula 16 is applied so as to conduct the RGB data->YCbCr data conversion by an integer operation:

$$Y = \left\lfloor \frac{219 \times (299 \times R + 587 \times G + 114 \times B) + 16 \times 255 \times 1000 + 255 \times 1000/2}{255 \times 1000} \right\rfloor \divideontimes$$

$$Cb = \left\lfloor \frac{224 \times 564 \times (-229 \times R - 587 \times G + 886 \times B) + 128 \times 225 \times 1000 \times 1000 + 255 \times 1000 \times 1000/2}{255 \times 1000 \times 1000} \right\rfloor$$

$$Cr = \left\lfloor \frac{224 \times 713 \times (701 \times R - 587 \times G - 114 \times B) + 128 \times 225 \times 1000 \times 1000 + 255 \times 1000 \times 1000/2}{255 \times 1000 \times 1000} \right\rfloor$$

[Formula 16]

※⌊ ⌋: round a fractional part and the same in the following

In the formula 16, an addition operation and a multiplication operation, which do not cause an error unless the overflow occurs, are conducted in an earlier step. A division operation, which easily cause the overflow and the error, is conducted in a latex step. In addition, after half denominator is added, a fractional part is rounded, so as to count fractions over ½ as one and disregarding the rest.

That is, in a Y data converting expression in the formula 16, after "255×1000/2" showing half the denominator is added to a numerator, the numerator is divided by the denominator "255×1000" and then a fractional part is rounded. In Cb and Cr data converting expressions in the formula 16, "255×1000/2" showing half a denominator is added to a numerator, a result from calculating the numerator is divided by the denominator "255×1000×1000", and then a fractional part is rounded.

It is possible to conduct an arithmetic operation in accordance with the formula 16 by integers and to obtain an operation result by an integer value.

On the other hand, the digital color converting function, which is cited in the international standard ITU-R BT.601 and quantizes the analog Y, Cb, and Cr signals, can be applied to a YCbCr data<-RGB data conversion. Conventionally, a converting process by a real number operation shown in the following formula 17 is used:

$$R = \left[ \frac{Cr - 128}{0.713 \times 224} + \frac{Y - 16}{219} \right] \times 255$$

$$G = \left[ \frac{Y - 16}{219} - \frac{0.299 \times (Cr - 128)}{0.713 \times 224 \times 0.587} - \frac{0.114 \times (Cb - 128)}{0.564 \times 224 \times 0.587} \right] \times 255$$

$$B = \left[ \frac{Cb - 128}{0.564 \times 224} + \frac{Y - 16}{219} \right] \times 255$$

[Formula 17]

However, when the formula 17 is calculated by a computer, errors occur due to an overflow of an arithmetic operation. On the contrary, in this embodiment, for the YCbCr data->RGB data conversion, instead of using the formula 17, the following formula 18 is applied so as to conduct the YCbCr data->RGB data conversion by an integer operation:

$$R = \left[ \frac{[219 \times 1000 \times (Cr - 128) + 713 \times 224 \times (Y - 16)] \times 255 + 713 \times 224 \times 219/2}{713 \times 224 \times 219} \right]$$ [Formula 18]

-continued $$G = \left[ \frac{\begin{bmatrix} 713 \times 224 \times 587 \times 564(Y - 16) - \\ 229 \times 219 \times 564 \times 1000 \times (Cr - 128) - \\ 114 \times 219 \times 713 \times 1000 \times (Cb - 128) \end{bmatrix} \times 255 + 219 \times 713 \times 224 \times 587 \times 564/2}{219 \times 713 \times 224 \times 587 \times 564} \right]$$

$$B = \left[ \frac{[219 \times 1000 \times (Cb - 128) + 564 \times 224 \times (Y - 16)] \times 255 + 564 \times 224 \times 219/2}{564 \times 224 \times 219} \right]$$

In the formula 18, an addition operation and a multiplication operation, which do not cause an error unless the overflow occurs, are conducted in an earlier step. A division operation, which easily cause the overflow and the error, is conducted in a later step. In addition, after half denominator is added, a fractional part is rounded, so as to count fractions over ½ as one and disregarding the rest.

That is, in a R data converting expression in the formula 18, after "713×224×219/2" showing half the denominator is added to a numerator, the numerator is divided by the denominator "713×224×219" and then a fractional part is rounded. In a G data converting expression in the formula 18, "219×713×224×587×564/2" showing half a denominator is added to a numerator, a result from calculating the numerator is divided by the denominator "219×713×224×587×564", and then a fractional part is rounded. In a B data converting expression in the formula 18, "564×224×219/2" showing half a denominator is added to a numerator, a result from calculating the numerator is divided by the denominator "564×224×219", and then a fractional part is rounded.

It is possible to conduct an arithmetic operation in accordance with the formula 18 by integers and to obtain an operation result by an integer value.

As described above, in the YCbCr data->RGB data->Y'Cb'Cr' data conversion, by using the color space YCbCr as the common unit system, the backward transformation at the YCbCr data->RGB data side is conducted by using the color converting expression shown by the formula 16, and the forward transformation at the RGB data->Y'Cb'Cr' data side is conducted by using the color converting expression shown by the formula 18. Table 1 shows a color conversion results of the backward transformation by the formula 16 and the forward transformation by the formula 18.

TABLE 1

|  | YCbCr data | (by formula 18) → | RGB data | (by formula 16) → | restored YCbCr data |
|---|---|---|---|---|---|
| example 1. | 16 (Y) |  | 0 (G) |  | 16 (Y) |
|  | 128 (Cb) |  | 0 (B) |  | 128 (Cb) |
|  | 128 (Cr) |  | 0 (R) |  | 128 (Cr) |
| example 2. | 126 (Y) |  | 128 (G) |  | 126 (Y) |
|  | 128 (Cb) |  | 128 (B) |  | 128 (Cb) |
|  | 128 (Cr) |  | 128 (R) |  | 128 (Cr) |
| example 3. | 107 (Y) |  | 16 (G) |  | 107 (Y) |
|  | 191 (Cb) |  | 233 (B) |  | 191 (Cb) |
|  | 208 (Cr) |  | 234 (R) |  | 208 (Cr) |
| example 4. | 112 (Y) |  | 112 (G) |  | 112 (Y) |
|  | 139 (Cb) |  | 134 (B) |  | 139 (Cb) |
|  | 123 (Cr) |  | 104 (R) |  | 123 (Cr) |
| example 5. | 218 (Y) |  | 235 (G) |  | 218 (Y) |
|  | 128 (Cb) |  | 235 (B) |  | 128 (Cb) |
|  | 128 (Cr) |  | 235 (R) |  | 128 (Cr) |

According to the color conversion result shown in Table 1, Y=Y', Cb=Cb', and Cr=Cr' are maintained. Thus, it can be seen that a data compatibility (reversibility) concerning a color conversion is guaranteed.

[Example of Application to Color Space YMC Used for Print]

In the previous example, the application to the unit system of the color space RGB used for a display is described. Also, the present invention can be applied to a unit system of the color space YMC used for a print. In this case, Y, M, and C are set to be Y=MAX-B, M=MAX-G, and C=MAX-R in the formula 40 and the formula 42, so as to conduct the integer operation. MAX denotes a maximum value of the resolution level. For example, it the maximum level is 256, MAX is set to be MAX=256.

[Example of Application to Digital Type Compatible Color Conversion]

Another application to a color conversion formula cited in the international standard ITT-R BT.601 as an example. In this case, the unit system of the color space YCbCr is used as the common unit system. The data conversion of the backward transformation and the forward transformation shown as YCbCr data->R(d)G(d)B(d) data->Y'Cb'Cr' data is conducted between the unit system of the color space YCbCr and the unit system of the color space RGB used for the display, to conduct the reversible data conversion by the integer operation so that Y=Y'Cb=Cb', and Cr=Cr' are satisfied. In the data conversion such as the YCbCr data->R(d)G(d)B(d) data->Y'Cb'Cr' data conversion, the inventors found a color converting function for conducting an R(d)G(d)B(d) data->YCbCr data conversion, a color converting function for conducting a forward transformation of a YCbCr data<-R(d)G(d)B(d) data conversion, and a color converting function for conducting a backward transformation of an R(d)G(d)B(d) data->Y'Cb'Cr' data conversion.

An original color converting function is a color converting function cited in the international standard ITU-R BT.601. In the following, conventional converting formulae will be described.
  a. converting formula from analog RGB (R(a), G(a), B(a)) signals to quantized digital (R(d), G(d), B(d)) signals where $0 \leq R(a) \leq 256$, $0 \leq G(a) \leq 256$, $0 \leq B(a) \leq 256$, $$R(d)=219*R(a)/256+16$$

$$G(d)=219*G(a)/256+16$$

$$B(d)=219*B(a)/256+16 \quad \text{[formula 19]}$$

b. converting formula from the quantized digital (R(d), G(d), B(d)) signals to digital Y, Cb, Cr signals $$Y=(77*R(d)/256)+(150*G(d)/256)+(29*B(d)/256)$$

$$Cb=-(44*R(d)/256)-(87*G(d)/256)+(131*B(d)/256)+128$$

$$Cr=(131*R(d)/256)-(110*G(d)/256)-(21*B(d)/256)+128 \quad \text{[formula 20]}$$

Conventionally, the above formula 20 is used for a converting process. On the other hand, according to the present invention, the R(a)G(a)B(a) data->YCbCr data conversion is conducted by an operation in accordance with a color converting function shown by the following formula 21:

$$Y = \left\lfloor \frac{219 \times (77 \times R(a) + 150 \times G(a) + 29 \times B(a)) + 16 \times 256 \times 256 + 256 \times 128}{256 \times 256} \right\rfloor \quad \text{[Formula 21]}$$

$$Cb = \left\lfloor \frac{219 \times (-44 \times R(a) - 87 \times G(a) + 131 \times B(a)) + 128 \times 256 \times 256 + 256 \times 128}{256 \times 256} \right\rfloor$$

$$Cr = \left\lfloor \frac{219 \times (131 \times R(a) - 110 \times G(a) - 21 \times B(a)) + 128 \times 256 \times 256 + 256 \times 128}{256 \times 256} \right\rfloor$$

The YCbCr data->R(d)G(d)B(d) data conversion is conducted by an integer operation in accordance with a color converting function shown by the following formula 22:

$$R(d) = \left\lfloor \frac{(16772821 \times Y + 22904709 \times Cr - 41320 \times Cb - 2926513792) \times 2 + 16772821}{16772821 \times 2} \right\rfloor \quad \text{[Formula 22]}$$

$$G(d) = \left\lfloor \frac{(470873 \times Y - 329527 \times Cr - 157064 \times Cb + 62283648) \times 2 + 470873}{470873 \times 2} \right\rfloor$$

$$B(d) = \left\lfloor \frac{(16772821 \times Y - 102267 \times Cr + 29047960 \times Cb - 3705048704) \times 2 + 16772821}{16772821 \times 2} \right\rfloor$$

The R(d)G(d)B(d) data->Y'Cb'Cr' data conversion is conducted by an integer operation in accordance with a color converting function shown by the following formula 23:

$$Y' = \left\lfloor \frac{77 \times R(d) + 150 \times G(d) + 29 \times B(d) + 128}{256} \right\rfloor \quad \text{[Formula 23]}$$

$$Cb' = \left\lfloor \frac{-44 \times R(d) - 87 \times G(d) + 131 \times B(d) + 128 \times 256 + 128}{256} \right\rfloor$$

$$Cr' = \left\lfloor \frac{131 \times R(d) - 110 \times G(d) - 21 \times B(d) + 128 \times 256 + 128}{256} \right\rfloor$$

Accordingly, by using the color space YCbCr as the common unit system, for the data conversion of the backward transformation and the forward transformation of the YCbCr data->R(d)G(d)B(d) data->Y'Cb'Cr' data conversion, the R(a)G(a)B(a) data->YCbCr data conversion is conducted by using the color converting function shown by the formula 21, the YCbCr data->R(d)G(d)B(d) data conversion is conducted by using the color converting function shown by the formula 22, and the R(d)G(d)B(d) data->Y'Cb'Cr' data conversion is conducted by using the color converting function shown by the formula 23. Table 2 shows color conversion results from the formulae 21, 22, and 23.

TABLE 2

|  | YCbCr data | (by formula 22) → | R(d)G(d)B(d) data | (by formula 23) → | restored YCbCr data |
|---|---|---|---|---|---|
| example 1. | 16 (Y) |  | 16 (G) |  | 16 (Y) |
|  | 128 (Cb) |  | 16 (B) |  | 128 (Cb) |
|  | 128 (Cr) |  | 16 (R) |  | 128 (Cr) |
| example 2. | 128 (Y) |  | 128 (G) |  | 128 (Y) |
|  | 128 (Cb) |  | 128 (B) |  | 128 (Cb) |
|  | 128 (Cr) |  | 128 (R) |  | 128 (Cr) |
| example 3. | 106 (Y) |  | 16 (G) |  | 106 (Y) |
|  | 202 (Cb) |  | 234 (B) |  | 202 (Cb) |
|  | 222 (Cr) |  | 234 (R) |  | 222 (Cr) |
| example 4. | 112 (Y) |  | 112 (G) |  | 112 (Y) |
|  | 139 (Cb) |  | 131 (B) |  | 139 (Cb) |
|  | 123 (Cr) |  | 105 (R) |  | 123 (Cr) |
| example 5. | 235 (Y) |  | 235 (G) |  | 235 (Y) |
|  | 128 (Cb) |  | 235 (B) |  | 128 (Cb) |
|  | 128 (Cr) |  | 235 (R) |  | 128 (Cr) |

According to the color conversion results shown in the Table 2, the YCbCr data are restored. That is, Y=Y', Cb=Cb', and Cr=Cr' are maintained so that the data compatibility (reversibility) concerning the color conversion can be guaranteed.

[Application to Original Color Converting Function Bing Based on Brightness and Color Difference: JPEG 2000]

In a JPEG 2000 algorithm, a color space converting process is conducted by converting the RGB data into the YCbCr data being based on the brightness and color difference or conducting the backward transformation. However, this color space converting process can not be reversible as described in Description of the Related Art.

A. That is, as the color converting function of the conventional JPEG algorithm, a. conversion from RGB (R(0) G(0), B(0) signals to YCbCr (Y(o), Cb(o), Cr(o)) signals The following converting formula shown in formula 24 is used for the forwarding transformation:

$$\begin{bmatrix} Y(o) \\ Cb(o) \\ Cr(o) \end{bmatrix} = A \begin{bmatrix} R(o) \\ G(o) \\ B(o) \end{bmatrix} \quad [\text{Formula 24}]$$

A matrix denoted by a letter A in the formula 24 is described as follows:

$$A = \begin{bmatrix} x & 1-x-y & y \\ -\dfrac{x}{2(1-y)} & -\dfrac{1-x-y}{2(1-y)} & \dfrac{1}{2} \\ \dfrac{1}{2} & -\dfrac{1-x-y}{2(1-x)} & -\dfrac{y}{2(1-x)} \end{bmatrix}, \quad [\text{Formula 25}]$$

$$A^{-1} = \begin{bmatrix} 1 & 0 & 2(1-x) \\ 1 & -\dfrac{2y(1-y)}{1-x-y} & -\dfrac{2x(1-x)}{1-x-y} \\ 1 & 2(1-y) & 0 \end{bmatrix}$$

$$|A| = \dfrac{1-x-y}{4(1-x)(1-y)}$$

In the formula 25, x denotes a weighted coefficient of a red color, y denotes a weighted coefficient of a blue color, and 1-x-y denotes a weighted coefficient of a green color (where $0 \leq x < 1$. $0 \leq y < 1$, and x+y<1).

b. conversion from YCbCr (Y(0), Cb(0), Cr(0) signals to RGB (R(0), G(0), B(0)) signals The following formula 26 is used for the backward transformation:

$$\begin{bmatrix} R(o) \\ G(o) \\ B(o) \end{bmatrix} = A^{-1} \begin{bmatrix} Y(o) \\ Cb(o) \\ Cr(o) \end{bmatrix} \quad [\text{Formula 26}]$$

A matrix denoted by a letter A in the formula 26 is the same matrix shown by the formula 25.

The matrix A shown by the formula 25 will be described in detail. When x=299/1000=weighted coefficient of the red color, Y=114/1000=weighted coefficient of the blue color, and 1-x-y=587/1000=weighted coefficient of the green color, the matrix A is expressed as follows:

$$A \approx \begin{bmatrix} 0.299 & 0.587 & 0.114 \\ -0.16874 & -0.33126 & 0.5 \\ 0.5 & -0.41869 & -0.08131 \end{bmatrix}, \quad [\text{Formula 27}]$$

$$A^{-1} \approx \begin{bmatrix} 1 & 0 & 1.402 \\ 1 & -0.34414 & -0.71414 \\ 1 & 1.772 & 0 \end{bmatrix}$$

The matrix A is a converting matrix conventionally used as non-reversible color conversion in the JPEG 2000.

B. on the other hand, in the embodiment according to the present invention, similar to the previous applications, it is possible to conduct a reversible conversion by integer values for the color conversion in the JPEG 2000 algorithm. Thus, it is possible to obtain all variables and all coefficients and to obtain an operation result by an integer.

When x indicating the weighted coefficient of the red color, y indicating the weighted coefficient of the blue color, and 1-x-y indicating the weighted coefficient of the green color are expressed by $x = x_M/D$ and $y = y_M/D$ (where $x_M$, $y_M$, and D are all integers, and an index M is simply a part of a variable name, for example, the index M is used to distinguish "x" from "$x_M$"), $x_M$, $y_M$ and D are expressed under limitations of x and y concerning the formula 25 described above as follows:

$$0 \leq x_M < D, \ 0 \leq y_M < D, \text{ and } x_M + y_M < D. \quad [\text{Formula 28}]$$

In this case, by using coefficients concerning a matrix, the color converting process is conducted as follows. It should be noted that "(o)" of R(o), G(o), B(o), Y(o), Cb(o), and Cr(o) is additionally provided to distinguish from the variable names far general R, G, B, Y, Cb, and Cr used in other converting formulae described above, in order for conversion data in this case according to the present invention to indicate "original color being based on the brightness and the color difference". Thus, "(o)" is simply a part of a variable name.

a. conversion from RGB (R(0), G(0), B(0)) signals to YCbCr (Y (o), Cb(a), Cr(o)) signals A color converting function show in the following formula 29 is conducted by the integer operation for the forward transformation.

$$Y(o) = \left\lfloor \dfrac{2 \times (x_M \times R(o) + (D - x_M - y_M) \times G(o) + y_M \times B(o)) + D}{2 \times D} \right\rfloor \quad [\text{Formula 29}]$$

$$Cb(o) = \left\lfloor \dfrac{\left\lfloor \dfrac{\text{Max}_{RGB} + 1}{2} \right\rfloor \times 2 \times (D - y_M) - x_M \times R(o) - (D - x_M - y_M) \times G(o) + (D - y_M) \times (B(o) + 1)}{2 \times (D - y_M)} \right\rfloor +$$

-continued $$Cr(o) = \left\lfloor \frac{\left\lfloor \frac{\text{Max}_{RGB}+1}{2} \right\rfloor \times 2 \times (D-x_M) + (D-x_M) \times (R(o)+1) - (D-x_M-y_M) \times G(o) - y_M \times B(o)}{2 \times (D-x_M)} \right\rfloor - \left\lfloor \frac{\text{MAX}_{RGB}+1}{2} \right\rfloor$$

When $\text{MAX}_{RGB}$ denotes a level number (integer) and a first limitation concerning input R(o), G(o), B(o) data, which are used to realize reversibility and compatibility described later in the converting process is eliminated, R(o), G(o), and B(o) are expressed as follows:

$$0 \leq R(o) \leq \text{MAX}_{RGB}-1, \ 0 \leq G(o) \leq \text{MAX}_{RGB}-1,$$

$$0 \leq B(o) \leq \text{MAX}_{RGB}-1. \quad \text{[Formula 30]}$$

For example, when x=299/1000=weighted coefficient of the red color, y=114/1000=weighted coefficient of the blue color, 1-x-y=587/1000 weighted coefficient of the green color, and $\text{MAX}_{RGB}$=256 levels in order to meet the JPEG algorithm, the formula 29 concerning the RGB (R(o), G(o), B(o)) signals->YCbCr (Y(o), Cb(o), Cr(0)) signals conversion can be replaced with the following color converting function shown in formula 31:

$$Y(o) = \left\lfloor \frac{(299 \times R(o) + 587 \times G(o) + 114 \times B(o)) + 500}{1000} \right\rfloor$$

$$Cb(o) = \left\lfloor \frac{128 \times 2 \times 886 - 299 \times R(o) - 587 \times G(o) + 886 \times (B(o)+1)}{2 \times 886} \right\rfloor - 128$$

$$Cr(o) = \left\lfloor \frac{128 \times 2 \times 701 + 701 \times (R(o)+1) - 587 \times G(o) - 114 \times B(o)}{2 \times 701} \right\rfloor - 128$$

[Formula 31]

By combining the formula 31 and formula 38 described later, it is possible to improve the color converting function, which is known as not-reversible in the JPEG 2000 algorithm to be a reversible color converting function.

In addition, by applying a bit shift to the color converting function shown by the formula 31, it is possible to improve an operation speed. For example, since the level number of the RGB is 256 and an available range is from 0 to 255, the formula 31 can be expressed in C language where MAX_KAICHO=155 as a maximum level value, bitSHIFT=12 (the number of bit shifts) as exponents of powers of 2, iR0RS, iG0RS, and iB0RS denote R(o) G(o), and B(o), and iY0RS, iCbRS, and iCrRS denote Y(o), Cb(o), and Cr(o).

[Formula 32]
iY0RS=((MAX_KAICHO+1)/2*1000 + 299*iR0RS+587*iG0RS+114*iB0RS + 500)/(1000) - (MAX_KAICHO+1)/2
≈(
 (
  ((MAX_KAICHO+1)/2 << bitSHIFT)
  + ((299<<bitSHIFT)+500)/1000*iR0RS
  + ((587<<bitSHIFT)+500)/1000*iG0RS
  + ((114<<bitSHIFT)+500)/1000*iB0RS
  + (1 << (bitSHIFT-1))
 ) >> bitSHIFT
) - (MAX_KAICHO+1)/2;
iCbRS=((MAX_KAICHO+1)/2*2*886-299*iR0RS-587*iG0RS+(886)

-continued

*(iB0RS+1))/(2*886) - (MAX_KAICHO+1)/2
≈(
 (
  ((MAX_KAICHO+1)/2 << bitSHIFT)
  - ((299<<bitSHIFT)+886)/(2*886)*iR0RS
  - ((587<<bitSHIFT)+886)/(2*886)*iG0RS
  + ((886<<bitSHIFT)+886)/(2*886)*iB0RS
  + (1 << (bitSHIFT-1))
 ) >> bitSHIFT
) - (MAX_KAICHO+1)/2;
iCrRS=((MAX_KAICHO+1)/2*2*701-114*iB0RS-587*iG0RS+(701)*(iR0RS+1))/(2*701) - (MAX_KAICHO+1)/2
≈(
 (
  ((MAX_KAICHO+1)/2 << bitSHIFT)
  + ((701<<bitSHIFT)+701)/(2*701)*iR0RS
  - ((114<<bitSHIFT)+701)/(2*701)*iG0RS
  - ((587<<bitSHIFT)+701)/(2*701)*iG0RS
  + (1 << (bitSHIFT-1))
 ) >> bitSHIFT
) - (MAX_KAICHO+1)/2;

The formula 32 can be simply expressed as follows:

iY0RS=((1225*iR0RS+2404*iG0RS+467*iB0RS+(257<<11))>>12)-128;

iCbRS=((-691*iR0RS-1357*iG0RS+(iB0RS+257)<<11))>>12)-128;

iCrRS=((((iR0RS+257)<<11)-1715*iG0RS-333*iB0RS)>>12)-128;     [Formula 33]

The formula 33 can be further simplified as follows;

iY0RS=(((128<<12)+1225×iR0RS+2404×iG0RS+467×iB0RS+(1<<11))>>12)-128;

iCbRS=(((128<<12)-691×iR0RS-1357×iG0RS+2048×iG0RS+(1<<11))>>12)-128;

iCrRS=(((128<<12)-+2048×iRORS-1715×iGORS-333×iBORS+(1<<11))>>12)-128;     [Formula 34]

In addition, the formula 34 can be expressed by using powers of 2 as follows:

$$Y(o) = \left\lfloor \frac{(128 \times 2^{12}) + 1225 \times R(o) + 2404 \times G(o) + 467 \times B(o) + 2^{11}}{2^{12}} \right\rfloor - 128 \quad \text{[Formula 35]}$$

$$Cb(o) = \left\lfloor \frac{(128 \times 2^{12}) - 691 \times R(o) - 1357 \times G(o) + 2^{11} \times B(o) + 2^{11}}{2^{12}} \right\rfloor - 128$$

$$Cr(o) = \left\lfloor \frac{(128 \times 2^{12}) - 2^{11} \times R(o) - 1715 \times G(o) - 333 \times B(o) + 2^{11}}{2^{12}} \right\rfloor - 128$$

Regarding this color conversion, an available range of the input R(o)G(o)B(o) data is limited to realize the reversibility and the compatibility. That is, the available range of the input R(o)G(o)B(o) data inputted in the formula 29 is limited as follows:

$1 \leq R(o) \leq \text{MAX}_{RGB} - 2$, $1 \leq G(o) \leq \text{MAX}_{RGB} - 2$, and $1 \leq B(o) \leq \text{MAX}_{RGB} - 2$. [Formula 36]

For example, similar to the formula 31, in accordance with the JPEG 2000 algorithm, when x=299/1000=weighted coefficient of the red color, y=114/1000=weighted coefficient of the blue color, 1-x-y=587/1000=weighted coefficient of the green color, and $\text{MAX}_{RGB}=256$ levels, the formula 61 concerning the Y(o)Cb(o)Cf(o) data->R(o)G(o)B(o) data conversion can be replaced with a color converting function shown by the following formula 38:

$$R(o) = \left\lfloor \frac{(1000 \times Y(o) + 1402 \times Cr(o)) + 500}{1000} \right\rfloor \quad \text{[Formula 38]}$$

$$G(o) = \left\lfloor \frac{(587 \times 1000 \times Y(o) - 2 \times 114 \times 886 \times Cb(o) - 2 \times 299 \times 701 \times Cr(o)) + 587 \times 500}{587 \times 1000} \right\rfloor$$

$$B(o) = \left\lfloor \frac{(1000 \times Y(o) + 1772 \times Cb(o)) + 500}{1000} \right\rfloor$$

It is required to change values being out of boundary values to be the boundary values. If a value being out of we boundary value is input and the backward transformation is conducted in accordance with the formula 38, a result from the formula 29 described above may be out of the available range (limitation range). In this case, a problem occurs in that Y(o), Cb(o), and Cr(o) data can not be restored.

In a case of restoring original Y(o)Cb(o)Cr(o) data, as the available range (limitation range) of the input R(o)G(o)B(o) data, the R(o)G(o)B(o) data being already obtained are used for formula 38 described later. And in a case of simply restoring Y(o)Cb(o)Cr(o) data, there is no special limitation, and restored Y(o)Cb(o)Cr(o) data can be obtained by using the R(o)G(o)B(o) data obtained from the following formula 37 describe later as the input data for the above converting formula.

b. compatible conversion from integer values of the Y(o) Cb(o)Cr(o) data to integer values of the R(o)G(o)B(o) data The backward transforming can be conducted by an integer operation of a color converting function shown by the following formula 37:

In addition, by applying a bit shift to the color converting function shown by the formula 38, it is possible to improve an operation speed. For example, since the level number of the RGB is 256 and an available range is from 0 to 255, the formula 31 can be expressed in C language where MAX_KAICHO=155 as a maximum level value, bitSHIFT=12 (the number of bit shifts) as exponents of powers of 2, iR0RS, iG0RS, and iB0RS, denote R(o), G(o), and B(o), and iY0RS, iCbRS, and iCrRS denote Y(o), Cb(o), and Cr(o).

[Formula 39]
```
iR0RS=((MAX_KAICHO+1)/2*1000 + 1000*iY0S+2*701*iCrS + 500)/
      (1000) - (MAX_KAICHO+1)/2
     ≈(
        (
            ((MAX_KAICHO+1)/2 << bitSHIFT)
          + ((1000<<bitSHIFT)+500)/1000*iY0S
          + ((2*701<<bitSHIFT)+500)/1000*iCrS
          + (1 << (bitSHIFT-1))
        ) >> bitSHIFT
      ) - (MAX_KAICHO+1)/2;
```

$$R(o) = \left\lfloor \frac{2 \times (D \times Y(o) + 2 \times (D - x_M) \times Cr(o)) + D}{2 \times D} \right\rfloor \quad \text{[Formula 37]}$$

$$G(o) = \left\lfloor \frac{(2 \times ((D - x_M - y_M) \times D \times Y(o) - 2 \times y_M \times (D - y_M) \times Cb(o) - 2 \times x_M \times (D - x_M) \times Cr(o)) + (D - x_M - y_M) \times D}{2 \times (D - x_M - y_M) \times D} \right\rfloor$$

$$B(o) = \left\lfloor \frac{2 \times (D \times Y(o) + 2 \times (D - y_M) \times Cb(o)) + D}{2 \times D} \right\rfloor$$

-continued

```
iG0RS=(
        (MAX_KAICHO+1)/2*(2*587*1000)
            + 2*(587*1000*iY0S-2*114*886*iCbS-2*299*
                701*iCrS) + 587*1000
    ) / (2*587*1000)
    - (MAX_KAICHO+1)/2
 ≈(
        ((MAX_KAICHO+1)/2 << bitSHIFT)
    + ((2*587*1000/4<<bitSHIFT)+587*1000/4)/(2*587*1000/4)*
        iY0S
            - ((114*886<<bitSHIFT)+587*1000/4)/(2*587*
                1000/4)*iCbS
            - ((299*701<<bitSHIFT)+587*1000/4)/(2*587*
                1000/4)*iCrS
            + (1 << (bitSHIFT-1))
    ) >> bitSHIFT
    ) - (MAX_KAICHO+1)/2;
iB0RS=((MAX_KAICHO+1)/2*1000 + 1000*iY0S+2*886*iCbS + 500)/
    (1000) - (MAX_KAICHO+1)/2
 ≈(
        (
            ((MAX_KAICHO+1)/2 << bitSHIFT)
            + ((1000<<bitSHIFT)+500)/1000*iY0S
            + ((2*886<<bitSHIFT)+500)/1000*iCbS
            + (1 << (bitSHIFT-1))
        ) >> bitSHIFT
    ) - (MAX_KAICHO+1)/2;
```

The formula 39 can be simplified as follows:

$iR0RS=((((257+(iY0S<<1))<<11)+5743*iCrS)>>12)-128;$ $iG0RS=((((257+(iY0S<<1))<<11)-1410*iCbS-2925*iCrS)>>12)-128;$ $iB0RS=((((257+(iY0S<<1))<<11)+7258*iCbS)>>12)-128;$ [Formula 40]

The formula 40 can be further simplified as follows:

$iR0RS=(((128<<12)+4096\times iY0S+5743\times iCrS+(1<<11))>>12)-128;$ $iG0RS=(((128<<12)+4096\times iY0S-1410\times iCbS-2925\times iCrS+(1<<11))>>12)-128;$ $iB0RS=(((128<<12)+4096\times iY0S+7258\times iCbS+(1<<11))>>12)-128;$ [Formula 41]

The formula 41 can be expressed by using powers of 2 as follows:

$$R(o) = \left\lfloor \frac{(128 \times 2^{12}) + 2^{12} \times Y(o) + 5743 \times Cr(o) + 2^{11}}{2^{12}} \right\rfloor - 128$$

$$G(o) = \left\lfloor \frac{(128 \times 2^{12}) + 2^{12} \times Y(o) - 1410 \times Cb(o) - 2925 \times Cr(o) + 2^{11}}{2^{12}} \right\rfloor - 128$$

$$B(o) = \left\lfloor \frac{(128 \times 2^{12}) + 2^{12} \times Y(o) + 7258 \times Cb(o) + 2^{11}}{2^{12}} \right\rfloor - 128$$

In order to realize the reversibility and the compatibility by operations in accordance with the above-described converting formulae, it is required to limit an available range of the input Y(o)Cb(o)Cr(o) data. First, it is assumed that the input Y(o)Cb(o)Cr(o) data are the Y(o)Cb(o)Cr(o) data obtained by the formula 29 described above. In order for Y(o)"Cb(o)"Cr(o)" data in which an editorial process such as an image modification, an electronic watermark, or a like is additionally provided to the Y(o)Cb(o)Cr(o) data to be effective, based on a maximum displacement difference with respect to an original value, a boundary value is changed to be within an allowance range in the R(o)G(o)G(o) data, which are original for the Y(o)Cb(o)Cr(o) data, beforehand.

In the following, in order to prevent image data from being out of the boundary value by the image modification, a method for changing the boundary value to be within the allowance range before the image modification will be described. Each influence degree of $\Delta Y$, $\Delta Cb$, and $\Delta Cr$ of Y(o), Cb(o), and Cr(o) with respect to the R(o)G(o)B(o) data is shown by each of the following ratios:

$\Delta R:\Delta Y:\Delta Cr=1:1:(2(D-x_M)/D)$ $\Delta G:\Delta Y:\Delta Cr:\Delta Cb=1:1:(2x_M(D-x_M)/((D-x_M-y_M)*D)):(2y_M(D-y_M)/((D-x_M-y_M)*D))$ $\Delta B:\Delta Y:\Delta Cb=1:1:(2(D-y_M)/D)$ For example, when D=1000, $x_M$=299, and $y_M$=114, $\Delta R:\Delta Y:\Delta Cr \approx 1:1:1.40,$ $\Delta G:\Delta Y:\Delta Cr:\Delta Cb \approx 1:0.71:0.34,$ $\Delta B:\Delta Y:\Delta Cb \approx 1:1:1.77.$ For example, with respect to G data, a change in increments of $\Delta Y=1$, $\Delta Cb=1$, and $\Delta Cr=1$ becomes a displacement of 2.05 (=1+0.34+0.71). Thus, in a case of $MAX_{RGB}=256$ levels, before the editorial process is started, an allowance range of the green color is changed to $4 \leq G \leq 251$. Accordingly, even if the displacement is newly added, it is possible to suppress within an original allowance range $1 \leq G \leq 254$.

By using the R(o)G(o)B(o) data where the change concerning the boundary values is conducted as described above, Y(o), Cb(o), and Cr(o) are calculated in accordance with the converting formula shown by the formula 29. Even if the displacement within the allowance range is applied to each of the calculated Y(o), Cb(o), and Cr(o) and the RGB conversion is conducted in accordance with the converting formula shown by the formula 37, it is possible to restore the Y(o)Cb(o)Cr(o) data where the displacement of the allowance range is applied.

These conversions are connected to be a Y(o)Cb(o)Cr(o)->R(o)G(o)B(o)->Y(o)'Cb(o)'Cr(o)' data conversion. There-

[Formula 42]

fore, it is possible to restore the Y(o)Cb(o)Cr(o) data. That is, Y(o)'Cb(o)'Cr(o)'=Y(o)Cb(o)Cr(o) can be realized.

In detail, in a case of $x_M$=114, D=1000, and $MAX_{RGB}$=256, the color conversion can be conducted as follows:

(1) allowance range of an original RGB to generate Y(o)Cb(o)Cr(o): input of the converting formula shown by the formula 29

$1 \leq R(o) \leq 254, 1 \leq G(o) \leq 254, 1 \leq B(o) \leq 254.$ (2) conversion result range of Y(o)Cb(o)Cr(o) generated in the allowance range shown in the above (1): input of the converting formula shown by the formula 37

$1 \leq Y(o) \leq 254, -126 \leq Cb(o) \leq 127, -126 \leq Cr(o) \leq 127.$ (3) conversion result range of the RGB generated by the converting formula shown by the formula 37 in the conversion result range shown in the above (2): input of the converting formula shown by the formula 29

$1 \leq R(o) \leq 255, 1 \leq G(o) \leq 255, 1 \leq B(o) \leq 255.$ (4) conversion result range of the Y(o)Cb(o)Cr(o) restored by the converting formula shown by the formula 29 in the conversion result range shown in the above (3)

$1 \leq Y(o) \leq 254, -126 \leq Cb(o) \leq 127, -126 \leq Cr(o) \leq 127.$

Table 3 shows color conversion results from the color converting function.

TABLE 3

| | YCbCr data | → | R(o)G(o)B(o) data | → | restored YCbCr data |
|---|---|---|---|---|---|
| example 1. | 1 (Y) | | 1 (G) | | 1 (Y) |
| | 0 (Cb) | | 1 (B) | | 0 (Cb) |
| | 0 (Cr) | | 1 (R) | | 0 (Cr) |
| example 2. | 128 (Y) | | 128 (G) | | 128 (Y) |
| | 0 (Cb) | | 128 (B) | | 0 (Cb) |
| | 0 (Cr) | | 128 (R) | | 0 (Cr) |
| example 3. | 105 (Y) | | 0 (G) | | 105 (Y) |
| | 84 (Cb) | | 254 (B) | | 84 (Cb) |
| | 106 (Cr) | | 254 (R) | | 106 (Cr) |
| example 4. | 112 (Y) | | 112 (G) | | 112 (Y) |
| | 11 (Cb) | | 131 (B) | | 11 (Cb) |
| | −5 (Cr) | | 105 (R) | | −5 (Cr) |
| example 5. | 254 (Y) | | 254 (G) | | 254 (Y) |
| | 0 (Cb) | | 254 (B) | | 0 (Cb) |
| | 0 (Cr) | | 254 (R) | | 0 (Cr) |

According to the color conversion results, the YCbCr data are restored, that is, Y=Y', Cb=Cb', and Cr=Cr' are maintained. Therefore, it can be wean that it is possible to guarantee the data compatibility (reversibility) concerning the color conversion.

Figure 2:
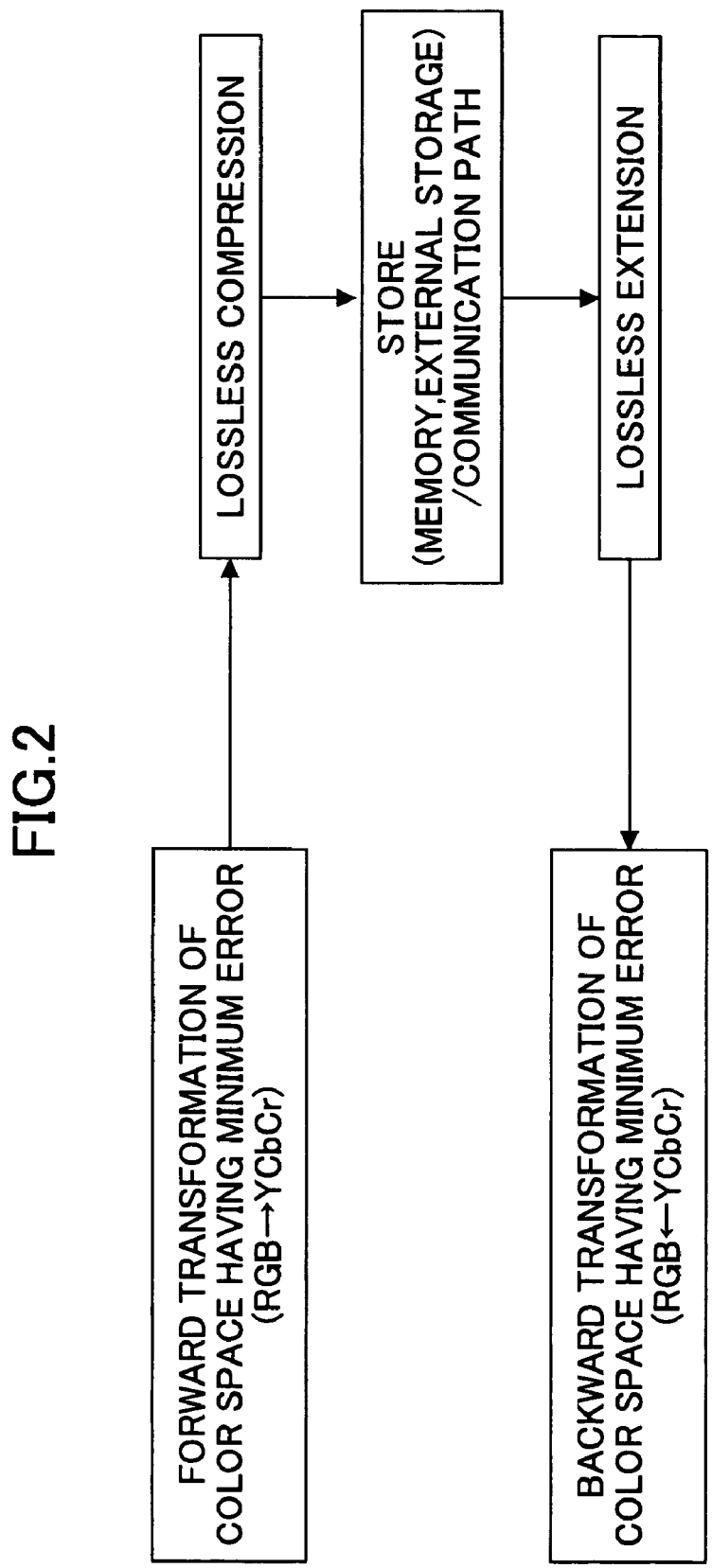
FIG. 2 is a diagram schematically illustrating an application to JPEG 2000.

As a result, for example, even if a color conversion is generally defined as a non-reversible transforming process in the JPEG 2000 algorithm schematically shown in FIG. 2, it is possible to change the reversible color conversion, it is possible to change the color conversion to be reversible by applying the embodiment of the present invention. FIG. 2 illustrates a compressing/extending system similar to FIG. 1. In FIG. 2, in a compression system, after the RGB->YCbCr conversion is conducted by the forward transformation of the color space having minimum error, the lossless compressing process such as a wavelet conversion, an entropy coding, or a like is conducted, and then encoded data are stored in a memory and an external storage device or distributed through a communication path such as the Internet. In an extension system, the encoded data are read from the memory or provided through the communication path, and the encoded data by being compressed are reversibly extended in a reverse procedure. Consequently, the YCbCr->RGB conversion is conducted by the backward transformation of, the color space having the minimum error is conducted so as to recover image data from the encoded data.

The reversible transformation can be realized by applying the color conversion described above to the forward and backward transformation of the color space having the minimum error. Therefore, even in JPEG 2000 algorithm, the color conversion can be the reversible transformation, and an image quality can be guaranteed. Also, an analog type compatible color converting algorithm and a digital type compatible color converting algorithm can be realized.

Figure 3:
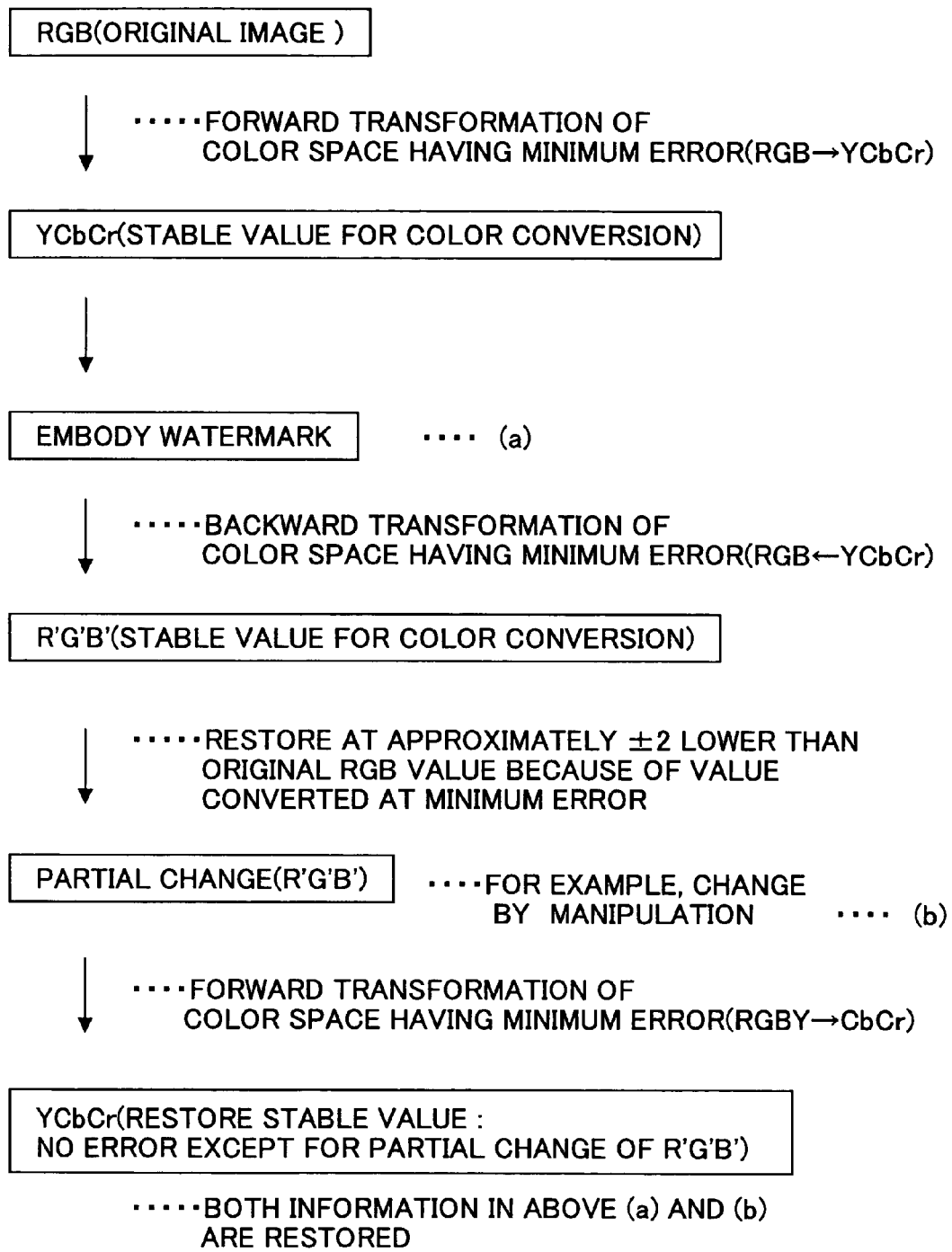
FIG. 3 is a diagram schematically illustrating an application to a usage requiring a reversible color conversion.

In the following, a usage requiring the reversible color conversion will be described with reference to FIG. 3, as an application example in a case in that an editorial process such as a manipulation or a like.

(1) First, a procedure for generating 4:2:2 YCbCr data from RGB based data will be described. The procedure realizes a perfect restored YCbCr data conversion of 4:2:2 YCbCr->RGB->4:2:2 YCbCr conversion When R0G0B0 and R1G1B1 are assumed as two pixels being adjacent each other as the RGB based data, Cb and Cr are calculated by using the color converting function shown by the formula 18 based on R=(R0+R1)/2, G=(G0+G1)/2, and B=(B0+B1)/2. Y0 and Y1 are calculated by the color converting function shown by the formula 18 by the color converting function shown by the formula 18 by using R0G0B0 and R1G1B1, respectively.

R0G0B0 and R1G1B1 are recalculated by conducting the backward transformation based on Y0, Y1, Cb, and Cr calculated above. If each of the recalculated R0G0B0 and R1G1B1 is not greater than or equal to 0 and less than or equal to 255, Y0 and Y1 are recalculated based on the above R, G, and B (each average of R0G0B0 and R1G1B1).

(2) Next, input (arbitrary) 4:2:2 YCbCr based data->RGB->4:2:2 perfect recovered YCbCr data conversion is realized. A procedure for changing input 4:2:2 YCbCr based data will be described.

R, G, and B can be arbitrary values independently from each other within a range $0 \leq R, G, B \leq 255$. However, in addition to applying limitations of $16 \leq Y \leq 235$, $16 \leq Cb \leq 240$, and $16 \leq Cr \leq 240$ to the YCbCr data, another condition is applied in that when R, G, and B are calculated from Y, Cb, and Cr, it is not effective if the conversion results of R, G, and B are not within ranges $0 \leq R, G, B \leq 255$. Therefore, first, by using YCbCr->RGB converting expression by the color converting function shown by the formula 22 to the input 4:2:2 YCbCr based data, R0G0B0 and R1G1B1 of the RGB based data described above (1) are calculated. In this case, when each calculation result becomes out of the boundary value (0,255), the calculation result is changed to be the boundary value.

Therefore since R0G0B0 and R1G1B1 become values being in the boundary values, the 4:2:2 YCbCr, in which R0G0B0 and R1G1B1 are applied to a method described the above (1) and calculated, becomes the perfect reversible YCbCr. A stable value for the color conversion described in FIG. 3 is a value having reversibility in that an original value is restored when the backward transformation is further conducted to a value where the color conversion is conducted.

(3) Next, a method for guaranteeing 4:2:2 YCbCR based data->RGB->4:2:2 perfect restored YCbCr data conversion where the editorial process (image modification, electronic watermark, or a like) is conducted will be described.

R0G0B0 and R1G1B1 of the RGB based data described above (1) are calculated by using the YCbCr->RGB conversion shown by the formula 18 for the 4:2:2 YCbCr based data before the editorial process is conducted. When each conversion result becomes out of the boundary value, the conversion result is changed to be the boundary value. In this case, an influence to an image value by the editorial process (image modification) is considered. Based on a maximum displacement difference with respect to a based value, the boundary values of R0G0B0 and R1G1B1 are changed to be within an allowance range.

A method for changing the boundary values into the allowance range before the image modification is conducted, in that even if the image modification is conducted, image data is not out of the boundary value. An influence degree of each of displacement values ΔY, ΔCb, and ΔCr of Y Cb Cr with respect to R0G0B0 and R1G1B1 is expressed as following ratio:

$$\Delta R:\Delta Y:\Delta Cr \approx 1:1.17:1.60$$

$$\Delta G:\Delta Y:\Delta Cr:\Delta Cb \approx 1:1.17:0.82:0.40$$

$$\Delta B:\Delta Y:\Delta Cb \approx 1:1.17:2.02$$

For example, a change in increments of ΔY=1, ΔCb=1, and ΔCr=1 for G data becomes a displacement of 2.39 (=1.17+0.82+0.40) and influences. Accordingly, if an allowance for the G data is changed to 3≦G≦252 before the editorial process is started, the G data can be set not to be out of the original allowance range of 0≦G≦255 even if the displacement is newly added.

By using the R0G0B0 and R1G1B1 where the allowance for the G data is changed, 4:2:2 YCbCr is calculated by the method described in the above (1) Even ifs the color conversion is conducted by adding the displacement to the allowable range to the calculated 4:2:2 YCbCr, the 4:2:2 YCbCR data where the displacement of the allowable range is added can be restored.

[Reversible Color Conversion Using Bit Shifts]

Next, a reversible color conversion (YCbCr->RGB->YCbCr) using bit shifts will be described. A process of an original RGB->YCbCr->RGB->Y'Cb'Cr'->R'G'B' conversion will be described in the following.

TCbCr (iY0S,iCbS,iCrS)=Y'Cb'Cr' (iY0RS,iCbRS, iCrRS) is realized, that is, iY0S=iY0RS, iCbS=iCbRS, and iCrS=iCrRS are realized. In this case, RGB=R'G'B' is realized.

The original RGB data within ranges 0≦R, G, B≦255 are converted into ranges 0≦Y≦255, −128≦Cb≦128, and −128≦Cr≦128 by the YCbCR conversion, converted into ranges −1≦R, G, B≦256 by the RGB conversion, and converted into ranges 0≦Y'≦255, −128Cb'≦128, and −128≦Cr'≦128 by the Y'Cb'Cr' conversion.

On the other hand, as for a stipulated range of an effective color that can be presented by 8 bits/color, for RGB type color, the following ranges are defined:

0≦R≦255, 0≦G≦255, and 0≦B≦−255.

and for YCbCr type color, the following ranges are defined:

0≦Y≦255, −128≦Cb≦+127, and −128≦Cr≦+127.

In these stipulated ranges, data ranges effective to reversibly convert are ranges 1≦R, G, B≦254 for the original image RGB, ranges 1≦Y≦254, 126≦Cb≦127, and −126≦Cr≦127 for the YCbCR conversion, ranges 0≦R, G, B≦255 for the RGB conversion, and ranges 1≦Y'≦254, −126≦Cb'≦127, and −126≦Cr'≦127 for the Y'Cb'Cr' conversion.

That is, the original image RGB within the ranges 1≦R, G, B≦254 can be reversibly converted.

However, the original image RGB when R, G, or B=0 or R, G, B=255, YCbCR and RGB may be out of the stipulated ranges, respectively in the original RGB->YCbCr->RGB->Y'Cb'Cr'->R'G'B' conversion. For example, there are one case of Cb=128 or one case of Cr=128, and many cases of R, G, B=(−1) or 256.

The RGB->YCbCr conversion is conducted after values of the original image RGB are changed to be in 1 to 254, respectively, so as that conversion results can be within the stipulated range. For example, a conversion table for converting into a predetermined value may be prepared.

Next, a memory capacity for maintaining the conversion table will be described by considering the boundary values during the converting process, with respect to the following state A, state B, and state C.

State A

The boundaries (Y<0 or 254≦Y, Cb≦−127 or 127<Cb, Cr≦≦127 or 127<Cr) of the original image RGB->YCbCr conversion are concerned. Cases of invalid data being out of the stipulated range are shown as follows.

[Formula 43]

| | |
|---|---|
| Y < 0 | 0 case/(256 × 256 × 256) color = 0% |
| Y > 255 | 0 case/(256 × 256 × 256) color = 0% |
| Cb < −128 | 0 case/(256 × 256 × 256) color = 0% |
| Cb > 127 | 1 case/(256 × 256 × 256) color ≈ 6 × 10$^{-6}$% |
| Cr < −128 | 0 case/(256 × 256 × 256) color = 0% |
| Cr > 127 | 1 case/(256 × 256 × 256) color ≈ 6 × 10$^{-6}$% |

State B

Only the YCbCr->RGB conversion is conducted (no compensating process is conducted). Then, similar to the above state A, the boundary values of the RGB are considered and cases of the invalid data being out of the stipulated range are considered as follows.

R<0:11,783 cases/(256×256×256) colors≈0.07%
R>255:11,883 cases/(256×256×256) colors≈0.07%
G<0:6,171 cases/(256×256×256) colors≈0.04%
G>255:6,117 cases/(256×256×256) colors≈0.04%
B<0:14,408 cases/(256×256×256) colors≈0.09%
B>255:14,529 cases/(256×256×256) colors≈0.09%

Accordingly, total 64,890 cases/(256×256×256) colors≈0.39% become the invalid data.

State C

The compensating process is conducted when the YCbCr->RGB conversion Similar to the above the states A and B, the boundary values of the RGB are considered, and cases of the invalid data being out of the stipulated range and change methods for these cases are considered. Table 4 shows results.

TABLE 4

| out of boundary value | change method | found when Y calculation | found when Cb calculation | found when Cr calculation | total |
|---|---|---|---|---|---|
| R < 0 | change to R = 0 | 0 (case) | 7 (case) | 1,118 (case) | 1,125 |
| R > 255 | R = 255 | 1 | 7 | 1,115 | 1,123 |
| G < 0 | G = 0 | 70 | 4 | 83 | 157 |
| G > 255 | G = 255 | 67 | 4 | 81 | 152 |
| B < 0 | B = 0 | 10 | 2,714 | 10 | 2,734 |
| B > 255 | B = 255 | 10 | 2,720 | 10 | 2,740 |
| total | | 158 | 5,456 | 2,417 | 8,031 |

As shown in the table 4, in the state C, total 8,031 cases become the invalid data.

For data which can not be reversibly converted to be within the stipulated range by the bit shifts in accordance with the formula 34 and the formula 40, in a case of using the conversion table as an exception, instead of applying the conversion table to the state B (64,891 cases), it is effective to apply the conversion table to the state C (8,031 cases). Accordingly, it is possible to reduce the memory capacity for maintaining the conversion table in the state C to be one eighth the memory capacity in the state B.

As described above, by applying the conversion table to the state C (8,031 cases), it is possible to realized the reversible conversion for 16,000,000 colors including the following examples 1 to 5 shown in table 3.

[Details]

Figure 4:
FIG. 4 is a diagram schematically illustrating results of an analog type color conversion.

FIG. 4 schematically shows the conversion results of a case in that arbitrary values in 0 to 255 are input for the RGB based data when the analog type color conversion using the formula 16 and the formula 18 is applied (R=104, G=112, and B=134). As a result, Y=Y', Cb=Cb', and Cr=Cr' are realized.

In a case in that arbitrary values in 0 to 255 are input for the R based data when the digital type color conversion is conducted in accordance with ITU-R BT.601 using the formula 21 and the formula 23 (R=104, G=112, and B=134), the conversion results are schematically shown in FIG. 5. As a result, Y=Y', Cb=Cb', Cr=Cr', R=R', G=G', B=B' are realized.

Figure 6:
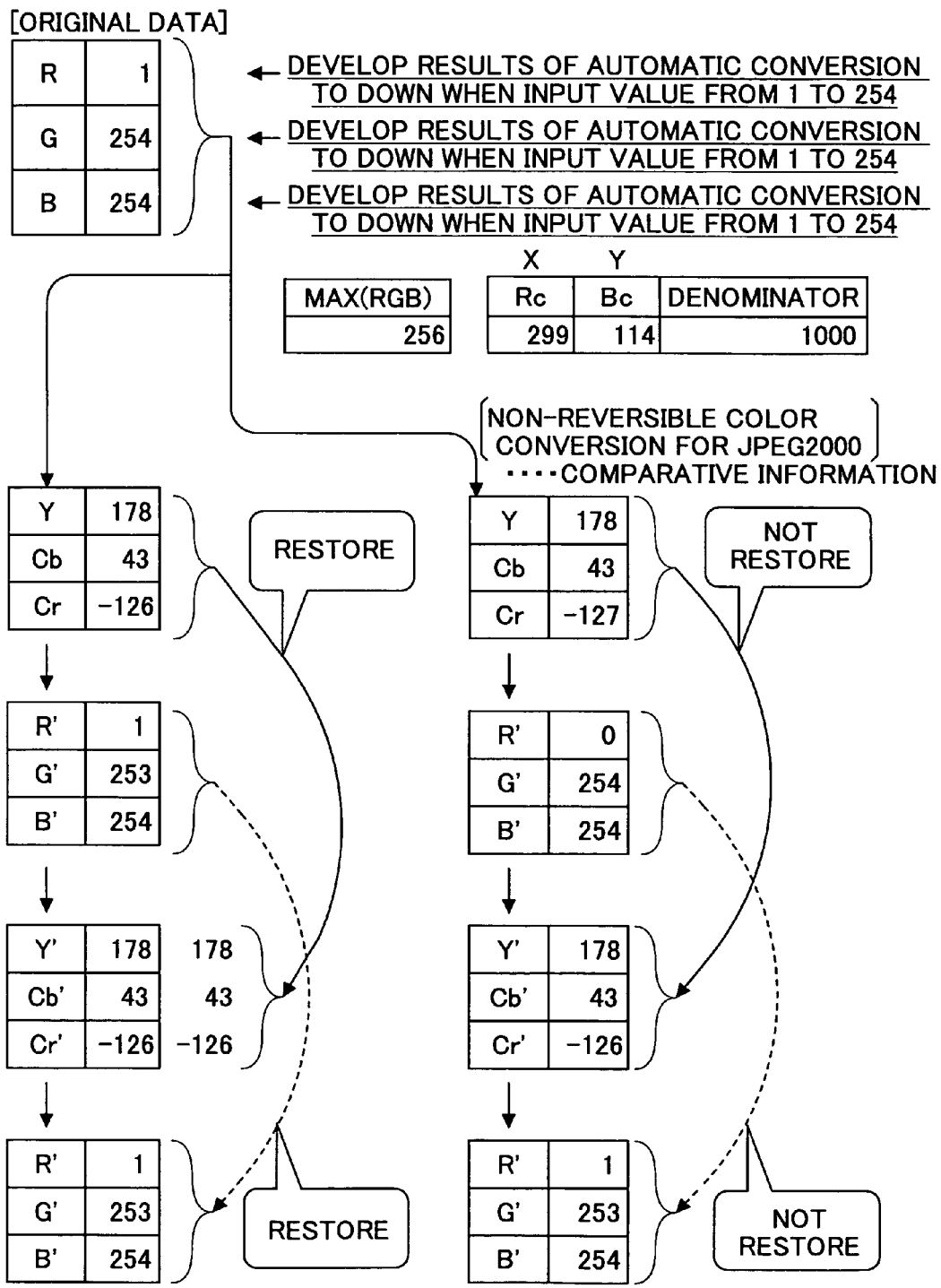
FIG. 6 is a diagram schematically showing results of the color conversion applied to JPEG 2000.

In a case in that arbitrary values in 1 to 254 are input for the RGB based data when the reversible color conversion is conducted in accordance with the JPEG 2000 using the formula 31 and the formula 37 (R=1, G=254, and B=254), the conversion results are schematically shown in FIG. 6 by comparing with a conventional not-reversible conversion as comparative information. While the convention not-reversible conversion is in a not-restored state, in a case of applying the present invention, Y=Y', Cb=Cb' and Cr=Cr', R'=R', G'=G', and B'=B' are restored.

[Variation]

In the above explanation, only the color conversion is focused, In general, the present invention can be applied to a reversible data conversion in that the forward transformation and the backward transformation reciprocally convert data between unit systems having different resolution levels, a first unit system having a lower resolution revel is used as the common unit system when the forward transformation and the backward transformation are conducted, the integer operation is conducted between data in the first unit system having the lower resolution level and data in a second unit system having a higher resolution level being higher than that of the first unit system.

In the following, it will be described that a perfect reversible conversion can be realized by a successive conversion of the first unit system having the lower resolution level->the second unit system having the higher resolution level->the first unit system having the lower resolution level.

Two resolution levels $\alpha$ and $\beta$ (where $\alpha > \beta > 0$. For example, in a case of mm<- ->BMU conversion, one inch is expressed by a unit system expressed by $\alpha = 540$: $1/100$ mm unit and another unit system expressed by $\beta = 1200$ BMU) are assumed. After data are converted by transforming a $\beta$ unit system to an $\alpha$ unit system, the converted data are further converted by converting to be back to the $\beta$ unit system In a case in that this conversion is connected by the following relationship:

$\beta \to \alpha$ converting function (argument $\beta$ data) [Formula 44]

$= L(2\alpha \times (\beta \text{ data}) \pm \beta) / 2\beta \rfloor$

↓

-continued round up if 5 or greater and round down if less than 5

$\alpha \to \beta$ converting function (argument $\alpha$ data)

$= L(2\beta \times (\alpha \text{ data}) \pm \alpha) / 2\alpha \rfloor$

↓ round up if 5 or greater and round down if less than 5 the following relationship is obtained.

$\alpha \times (\beta \text{ data})/\beta - 0.5$ including numbers after the decimal point: rational number $< \beta \to \alpha$ converting function (argument: $\beta$ data)

integer according to the above definition $< \alpha \times (\beta \text{ data}+1)/\beta - 0.5$ including numbers after the decimal point: rational number $< \alpha \times (\beta \text{ data})/\beta - 0.5$ including numbers after the decimal point: rational number $< \beta \to \alpha$ converting function (argument: $\beta$ data+1)

integer according to the above definition $\leq \alpha \times (\beta \text{ data}+1)/\beta + 0.5$ including numbers after the decimal point: rational number.

Since the $\beta \to \alpha$ converting function (argument: $\beta$ data+1)−$\beta \to \alpha$ converting function (argument: $\beta$ data)$> \alpha/\beta - 1 > 0$, even after data adjacent to original $\beta$ data (an integer incremented or decremented by 1 and an original integer), there is not duplicated data and ($\beta$ data)−1

$< (\beta \text{ data}) - 0.5 \times \beta/\alpha - 0.5$ $< \beta \times \beta \to \alpha$ converting function (argument: $\beta$ data)/$\alpha - 0.5$ $< \alpha \to \beta$ converting function (argument: $\beta \to \alpha$ converting function (argument: $\beta$ data)

$\leq \beta \times \beta \to \alpha$ converting function (argument: $\beta$ data)/$\alpha + 0.5$ $\leq (\beta \text{ data}) + 0.5 \times \beta/\alpha + 0.5$ $< (\beta \text{ data}) + 1$.

That is, since $\alpha \to \beta$ converting function showing an integer value (argument: $\beta \to \alpha$ converting function (argument: $\beta$ data))=($\beta$ data) can be obtained, the original $\beta$ data can be perfectly restored.

As a result, in a case in that by using the second unit system of BMU as the common unit system, when between the first unit system of $1/100$ mm and the second unit system, the data conversion of BMU data->$1/100$ mm data->BMU data is conducted, the reversible conversion is conducted by the integer operation so that the BMU data are always identical, In order to realize this reversible conversion, an integer operation in accordance with the following formula $<1/100 \text{ mm data}> = L(2540 \times <\text{BMU data}> + 600)/1200 \rfloor$ $<\text{BMU data}> = L(1200 \times <1/100 \text{ mm data}> + 1270)/2540 \rfloor$ [formula 45]

is conducted.

Calculations of powers of 2 in the formula 45 can be changed to bit shifts, so that it is possible to improve a calculation speed.

$$(1/100\text{mm data}) = \qquad\qquad\qquad\qquad\qquad\qquad\text{[Formula 47]}$$
$$($$
$$\lfloor L((2540<<\text{bitSHIFT})+600)/1200 \rfloor \times (\text{BMU data})+(1<<(\text{bitSHIFT}-1))$$
$$)>>\text{bitSHIFT};$$
$$(\text{BMU data}) =$$
$$($$
$$\lfloor L((1200<<\text{bitSHIFT})+1270)/2540 \rfloor \times (1/100 \text{ mm data})+$$
$$(1<<(\text{bitSHIFT}-1)))>>\text{bitSHIFT};$$

In the formula 47, since underlined parts are fixed values, the underlined parts are calculated beforehand. Therefore, it is possible to calculate at higher speed. Moreover, in a case of the number of bit shifts (bitSHIFT)=12, it is possible to convert without any error in a range of $0 \leq (\text{BMU data}) \leq 2400$.

Accordingly, in particular, for a conversion from the BMU data using an inch unit (inch, yard, foot, or a like) and a meter unit using 1/100 mm data between a unit used in a personal computer and another unit used in a printer, by using the BMU data having the lower resolution as the common unit system, the 1/100 mm data having the higher resolution can be sufficiently guaranteed. Therefore, it is possible to realize the reversible conversion for length data that can be perfectly restored.

Color conversion results obtained by using the converting function are shown in table 5.

TABLE 5

| | BMU data | → | 1/100 mm data | → | restored BMU data |
|---|---|---|---|---|---|
| example 1. | 0 BMU | | 0 (1/100 mm) | | 0 BMU |
| example 2. | 1 | | 2 | | 1 |
| example 3. | 2 | | 4 | | 2 |
| example 4. | 5 | | 11 | | 5 |
| example 5. | 65 | | 138 | | 65 |
| example 6. | 66 | | 140 | | 66 |
| example 7. | 666 | | 1410 | | 666 |
| example 8. | 1199 | | 2538 | | 1199 |
| example 9. | 1200 | | 2540 | | 1200 |

According to the color conversion results, the BMU data is restored and the data compatibility (reversibility) concerning a length conversion can be guaranteed.

In the following, a color conversion (YCbCr->RGB=>YCbCr) method for further guaranteeing the reversibility will be described.

[Color Conversion (YCbCr->RGB=>YCbCr) Method for Further Guaranteeing The Reversibility]

(1) Preparation (1-A) Expression of a Process for Rounding Down Fractional Part

In general, a division process for dividing positive fixed point data by different positive fixed point data in a computer rounds down the fractional part. In mathematics, a result from rounding down the fractional part of a real number A is expressed by putting the real number A in Gaussian symbols. Accordingly, the division result of the fixed point data by the computer is shown by using a modulo (showing a remainder of the division and shown by "mod") as follows.

$$\left\lfloor \frac{V}{U} \right\rfloor = \frac{V - V\bmod U}{U} \qquad\qquad\text{[Formula 48]}$$

In the formula 48, a result from dividing fixed point data V by fixed point data U by the computer is expressed.

(1-B) Expression of a Process for Rounding Up if 5 or Greater and Rounding Down if Less Than 5

Similar to the above (1-A), a result from rounding up if 5 or greater and rounding down if less than 5 is shown as follows, in a division result from dividing positive fixed data Y by positive fixed data x (Y/X) by the computer.

$$\left\lfloor \frac{2Y + X}{2X} \right\rfloor = \frac{2Y + X - (2Y + X)\bmod(2X)}{2X} \qquad\text{[Formula 49]}$$

(1-C) Expression of a Process for Rounding Up if 6 or Greater and Rounding Down if Less Than 6

Moreover, in the formula 49, a result from rounding up if 6 or greater and rounding down if less than 6 is shown as follows, in a division result from dividing positive fixed data Z by positive fixed data W (Z/W) by the computer.

$$\left\lfloor \frac{2Z + W - 1}{2W} \right\rfloor = \frac{2Z + W - 1 - (2Z + W - 1)\bmod(2W)}{2W} \qquad\text{[Formula 50]}$$

Based on explanations in the above (1-A), (1-B), and (1-C), a color converting method for further guaranteeing the reversibility will be described in the following. That is, a color conversion at one side is conducted by rounding up if 5 or greater and rounding down if less than 5, and another color conversion at another side (opposite direction of the color conversion) is conducted by rounding up if 6 or greater and rounding down if less than 6, so that the reversibility can be perfectly guaranteed.

(2) Method for Perfectly Restoring Data by a Successive Conversion of a Lower Resolution Level->a Higher Resolution Level->a Lower Resolution Level Two resolution levels $\alpha$ and $\beta$ are defined. A unit system is converted from a $\beta$ unit system to an $\alpha$ unit system and the converted unit system is further converted by using data in the converted unit system to be back to the $\beta$ unit system (where $\alpha > \beta > 0$). In this ease of the mm<- ->BMU conversion, one inch is expressed in the resolution level $\alpha$2540:1/100 mm unit or the resolution level $\beta$=1200 BMU unit.

$$\beta \to \alpha \text{ converting function(argument } \beta \text{ data)} \qquad\text{[Formula 51]}$$
$$= \lfloor (2\alpha \times \beta \text{ data}) + \underset{\downarrow}{\beta} ) / 2\beta \rfloor$$

round up if 5 or greater and round down if less than 5

$$= \frac{2\alpha(\beta \text{ data}) + \beta - (2\alpha(\beta \text{ data}) + \beta)\bmod(2\beta)}{2\beta}$$

$\alpha \to \beta$ converting function(argument $\alpha$ data)

-continued $$= \lfloor (2\beta \times (\alpha \text{ data}) + \alpha - 1)/2\alpha \rfloor$$

round up if 6 or greater and round down if less than 6

$$= \frac{2\beta(\alpha \text{ data}) + \alpha - 1 - (2\beta(\alpha \text{ data}) + \alpha - 1)\text{mod}(2\alpha)}{2\alpha}$$

In a case in that a relationship shown in the above formula 51 is satisfied, when

[Formula 52]

α→β converting function (argument: β→α converting function (argument: β data))

$$= \frac{2\beta(\alpha \text{ data}) + \alpha - 1 - (2\beta(\alpha \text{ data}) + \alpha - 1)\text{mod}(2\alpha)}{2\alpha}$$

$$= \frac{\left(\begin{array}{c} 2\beta\left(\frac{2\alpha(\beta)+\beta-(2\alpha(\beta)+\beta)\text{mod}(2\beta)}{2\beta}\right) + \alpha - \\ 1 - (2\beta\left(\frac{2\alpha(\beta)+\beta-(2\alpha(\beta)+\beta)\text{mod}(2\beta)}{2\beta}\right) + \\ \alpha - 1)\text{mod}(2\alpha) \end{array}\right)}{2\alpha}$$

$$= \frac{\left(\begin{array}{c} 2\alpha(\beta)+\beta-(2\alpha(\beta)+\beta)\text{mod}(2\beta)+\alpha-1- \\ (2\alpha(\beta)+\beta-(2\alpha(\beta)+\beta)\text{mod}(2\beta)+\alpha-1) \\ \text{mod}(2\alpha) \end{array}\right)}{2\alpha}$$

$$= \frac{\left(\begin{array}{c} 2\alpha(\beta)+\beta-(2\alpha(\beta)+\beta)\text{mod}(2\beta)+\alpha-1- \\ (2\alpha(\beta)+\beta-(2\alpha(\beta)+\beta)\text{mod}(2\beta)+\alpha-1) \\ \text{mod}(2\alpha) \end{array}\right)}{2\alpha}$$

$$= (\beta \text{ data}) + \frac{\beta + \alpha - 1 - (O \sim (2\beta - 1)) - (O \sim (2\alpha - 1))}{2\alpha}$$

$$= (\beta \text{ data}) + F(\alpha, \beta)$$

the following formula 53 is obtained.

$$-1 < \frac{-(\alpha+\beta-1)}{2\alpha} \le F(\alpha,\beta) \le \frac{(\alpha+\beta-1)}{2\alpha} < 1 \quad \text{[Formula 53]}$$

Therefore, since a result of the above calculations is obtained by an integer, this method can be expressed by using F(α, β).

That is, since the α->β converting function (argument: α->β converting function (argument: β data))=(β data) showing the integer value, it is possible to perfectly restore original β data and it is possible to guarantee the perfect restore even if α=β.

(3) Color Converting Method for Guaranteeing the Reversibility (3-A) Color Converting Expression Capable of Re-display (Precise Equation by a Rational Expression)

Based on the above [Application to Original color converting function Bing Based on Brightness and Color Difference JPEG 2000], an original color conversion can be expressed by a precise equation using rational numbers.

A YCbCr->RGB->YCbCr converting expression is described as follow:

$$\begin{bmatrix} R \\ G \\ B \end{bmatrix} = A^{-1} \begin{bmatrix} Y \\ Cb \\ Cr \end{bmatrix} \quad \begin{bmatrix} Y' \\ Cb' \\ Cr' \end{bmatrix} = A \begin{bmatrix} R \\ G \\ B \end{bmatrix} \quad \text{[Formula 54]}$$

In the formula 54, a matrix is denoted by a letter A and is expressed as follows.

$$A = \begin{bmatrix} x & 1-x-y & y \\ -\frac{x}{2(1-y)} & -\frac{1-x-y}{2(1-y)} & \frac{1}{2} \\ \frac{1}{2} & -\frac{1-x-y}{2(1-x)} & -\frac{y}{2(1-x)} \end{bmatrix}, \quad \text{[Formula 55]}$$

$$A^{-1} = \begin{bmatrix} 1 & 0 & 2(1-x) \\ 1 & -\frac{2y(1-y)}{1-x-y} & -\frac{2x(1-x)}{1-x-y} \\ 1 & 2(1-y) & 0 \end{bmatrix}$$

Accordingly, the reversibility can be guaranteed, (3-B) Color Converting Expression by Integers (Fixed Point Calculation)

(a) YCbCr->RGB conversion where calculation of rounding up if 6 or greater and rounding down if less than 6

Based on the formula 54 and the formula 55 shown in the above (3-A), by applying the formula 52 shown in the above (3-C), RGB can be expressed by YCbCr as follows.

$$R = Y + \frac{4(D-x)Cr + D - 1 - }{2D} \quad \text{[Formula 56]}$$
$$\phantom{R = Y +} \frac{(4(D-x)Cr + D - 1)\text{mod}(2D)}{2D}$$

$$G = \frac{Z - Z\text{mod}(2D(D-x-y))}{2D(D-x-y)}$$

$$B = Y + \frac{4(D-y)Cb + D - 1 - }{2D}$$
$$\phantom{B = Y +} \frac{(4(D-y)Cb + D - 1)\text{mod}(2D)}{2D}$$

where  Z=2D(D-x-y)Y-4(Dy-y²)Cb-4(Dx-x²)Cr+D(D-x-y)-1

(b) YCbCr->RGB conversion where calculation of rounding up if 5 or greater and rounding down if less than 5

Based on the formula 54 and the formula 55 shown in the above (3-A), by applying the formula 49 shown in the above (3-B), RGB can be expressed by YCbCr by substituting the formula 56 as follows. In the following expression, Xmod(x) =0 to (x−1), that is, a minimum value is 0 (zero), a maximum value is (x−1), and a mod calculation is expressed by "0~(x−1)".

$$Y' = \left\lfloor \frac{2Rx + 2G(D-x-y) + 2By + D}{2D} \right\rfloor \quad \text{[Formula 57]}$$

$$= \frac{2Rx + 2G(D-x-y) + 2By + D}{2D} - \frac{O \sim (2D-1)}{2D}$$

-continued $$= Y + \frac{1}{2D^2} \begin{pmatrix} 2D^2 - x - y - 1 \\ -x(O \sim (2D-1)) - (O \sim (2D(D-x-y)-1)) \\ -y(O \sim (2D-1)) - D(O \sim (2D-1)) \end{pmatrix}$$

$$= Y + Z_y(D, x, y)$$

The above formula 57 is calculated.

$$-1 < -\frac{2D^2 - D}{2D^2} \le Z_y(D, x, y) \le \frac{2D^2 - x - y - 1}{2D^2} < 1 \quad \text{[Formula 58]}$$

From the above formula 58, since Y' is an integer, $Z_y$ becomes 0 (zero). Accordingly, Y=Y' can be realized. Similarly, $$Cb' = \left[ \frac{2(D-y)\text{Max}_{RGB} - xR - (D-x-y)G + (D-y)B + (D-y)}{2(D-y)} \right] - \text{Max}_{RGB}$$

$$= \frac{\begin{pmatrix} 2(D-y)\text{Max}_{RGB} - xR - (D-x-y)G + \\ (D-y)B + (D-y) - (0 \sim (2(D-y)-1)) \end{pmatrix}}{2(D-y)} - \text{Max}_{RGB}$$

$$= Cb +$$

$$\frac{1}{4D(D-y)} \begin{pmatrix} 4D(D-y)\text{Max}_{RGB} + 2D^2 - 2Dy + \\ x + y - D + 1 + x(0 \sim (2D-1)) + (0 \sim (2D(D-x-y)-1)) - (D-y)(0 \sim (2D-1)) - 2D(0 \sim (2(D-y)-1)) \end{pmatrix} - \text{Max}_{RGB}$$

$$= Cb + Z_b(D, x, y)$$

the above formula 59 is calculated.

$$-1 < -\frac{4D(D-y) - 2D - x - 1}{4D(D-y)} \le \quad \text{[Formula 60]}$$

$$Z_b(D, x, y) \le \frac{4D-1}{4D} < 1$$

From the above formula 60, since Cb' is an integer, $Z_b$ becomes 0 (zero). Accordingly, Cb=Cb' can be realized. Moreover, $$Cr' = \left[ \frac{2(D-x)\text{Max}_{RGB} + (D-x)R - (D-x-y)G - yB + (D-x)}{2(D-x)} \right] - \text{Max}_{RGB}$$

$$= \frac{\begin{pmatrix} 2(D-x)\text{Max}_{RGB} + (D-x)R - (D-x-y)G - yB + (D-x) - (0 \sim (2(D-x)-1)) \end{pmatrix}}{2(D-x)} - \text{Max}_{RGB}$$

$$= Cr +$$

-continued $$\frac{1}{4D(D-x)} \begin{pmatrix} 4D(D-x)\text{Max}_{RGB} + 2D^2 - 2Dx + \\ x + y - D + 1 - (D-x)(0 \sim (2D+1)) + (0 \sim (2D(D-x-y) - 1)) + y(0 \sim (2D-1)) - 2D(0 \sim (2(D-x)-1)) \end{pmatrix} -$$

$$\text{Max}_{RGB}$$

$$= Cr + Z_r(D, x, y)$$

the above formula 61 is calculated.

$$-1 < -\frac{4D(D-x) - 2D - y - 1}{4D(D-x)} \le Z_r(D, x, y) \le \frac{4D-1}{4D} < 1 \quad \text{[Formula 62]}$$

From the above formula 62, since Cr' is an integer, $Z_r$ becomes 0 (zero). Accordingly, Cr=Cr' can be realized.

In addition, the color conversion according to the present invention can guarantee the reversibility for image data having more than 256 levels.

According to the present invention, in the forward transformation and the backward transformation, a unit system having a lower resolution revel is used as the common unit system and the data conversion is conducted by the integer operation between unit systems having different resolution levels, by using the common unit system. Therefore, a unit system having a higher resolution level is sufficiently processed and then it is possible to realize the reversible conversion where data can be perfectly restored.

In particular, regarding the digital color conversion using a quantization of analog Y, Cb, Cr signals between the unit system for the color space RGB and the unit system for the color space YCbCr, the unit system for the color space YCbCr having a lower resolution level is used as the common unit system. Thus, since the unit system for the color space RGB is sufficiently processed, it is possible to realize the reversible conversion in a color space where data can be perfectly restored.

Moreover, it is possible to realize the reversible conversion in the color space where data can be perfectly restored by a predetermined color converting function.

Furthermore, in a case in that a unit system for a print in such as a color space YMC is used, it is possible to realize the reversible conversion in the color space where data can be perfectly restored.

In particular, regarding the color conversion in accordance with the international standard specifying a data for at for converting an analog video signal into the digital data between the unit system in the color space RGB and the unit system in the color space YCbCr, the color space YCbCr having a lower resolution level is used as the common unit system. Therefore, since the unit system in the color space RGB having a higher resolution level can be sufficiently processed, it is possible to realize the reversible conversion of the color space where data can be perfectly restored.

In particular, regarding the color conversion of the original color based on the brightness and the color difference between the unit system in the color space RGB and the unit system in the color space YCbCr, the color space YCbCr having a lower resolution level is used as the common unit system. Therefore, since the color space RGB having a higher resolution level can be sufficiently processed, it is possible to realize the reversible conversion in the color space where data can be perfectly restored.

Moreover, in the available ranges for R(o)G(o)B(o) data and Y(o)Cb(o)Cr(o) data, a limited range is provided in that a maximum value and a minimum value are, limited. Therefore, without being out of the range of the color converting function, it is possible to conduct the compatible conversion where data can be perfectly restored.

In particular, regarding the length conversion between the EM type data using an inch unit system and the 1/100 mm type data using a meter unit system in the personal computer and the printer, the inch unit system for the BMU type data having a lower resolution level is used as the common unit system. Therefore, since the meter unit system for the 1/100 mm type data having a higher resolution level can be sufficiently processed, it is possible to realize the reversible conversion where length data can be perfectly restored.

The present invention is not limited to the specifically disclosed embodiments, and variations and modifications may be made without departing from the scope of the present invention.

The present application is based on the Japanese Priority Applications No. 2003-013585 filed on Jan. 22, 2003 and No. 2004-13138 filed on Jan. 21, 2004, the entire contents of which are hereby incorporated by reference.

What is claimed is:

1. A computer-implemented method for reversibly converting a data format as part of a coding and decoding process that includes compression, the computer-implemented method comprising:

performing a forward transformation and performing a backward transformation reciprocally on data being transformed between unit systems having different resolution levels defined by a brightness and a color difference, the forward transformation being performed prior to performing the compression, wherein in the forward transformation and the backward transformation, a first unit system having a lower resolution level is used as a common unit system, and the method further comprising performing a reversible data conversion with use of an integer operation for data in the first unit system and data in a second unit system having a higher resolution level higher than the first unit system, wherein the first unit system is for a first color space and the second unit system is for a second color space that is based on three primary colors of lights, the first color space being different than the second color space and the second color space having the higher resolution level, and further wherein performing the reversible data conversion comprises determining each component value of one of the first and second color spaces during data conversion in at least one of the forward and backward transformations based on all of the component values of the other of the first and second color spaces, and by using the first color space as the common unit system, the reversible data conversion is performed by the integer operation, so that the backward transformation to transform first data in the first color space to second data in the second color space and the forward transformation to transform the second data in the second color space to third data in the first color space are conducted, where the first data corresponds to the third data.

2. The computer-implemented method as claimed in claim 1, wherein the coding and decoding process includes performing a digital color conversion by quantizing analog data in the first color space, and by using the first color space as the common unit system.

3. The computer-implemented method as claimed in claim 2, wherein with respect to each of data converted from the first unit system to the second unit system and data converted from the second unit system to the first unit system, a process for rounding up if a first decimal place of the data is equal to or greater than 5 and rounding down if the first decimal place of the data is less than 5 is conducted.

4. The computer-implemented method as claimed in claim 2, wherein a first process for rounding up if a first decimal place of data is equal to or greater than 5 and rounding down if the first decimal place of the data is less than 5 is conducted with respect to the data converted from the first unit system to converted from the second unit system, and a second process for rounding up if a first decimal place of data is equal to or greater than 6 and rounding down if the first decimal place of the data is less than 6 is conducted at a conversion from the data in the second unit system to data in the first unit system.

5. The computer-implemented method as claimed in claim 1, wherein the coding and decoding process includes performing a color conversion in accordance with an international standard in which the data format for converting an analog video signal into digital data is specified.

6. The computer-implemented method defined in claim 5 wherein the first data in the first color space are YCbCr data, and the second data in the second color space are quantized digital R(d)G(d)B(d) data, and the third data in the first color space are Y'Cb'Cr', and in a case of converting to the Y'Cb'Cr' data after the YCbCr data is converted into the RGB data, wherein to convert analog R(a)G(a)B(a) data to YCbCr data, the forward transformation uses a color converting function defined as follows:

$$Y = \left[ \frac{219 \times (77 \times R(a) + 150 \times G(a) + 29 \times B(a)) + 16 \times 256 \times 256 + 256 \times 128}{256 \times 256} \right]$$

$$Cb = \left[ \frac{219 \times (-44 \times R(a) - 87 \times G(a)) + 131 \times B(a)) + 128 \times 256 \times 256 + 256 \times 128}{256 \times 256} \right]$$

$$Cr = \left[ \frac{219 \times (131 \times R(a) - 110 \times G(a) - 21 \times B(a)) + 128 \times 256 \times 256 + 256 \times 128}{256 \times 256} \right],$$

where $0 \leq R(a) \leq 256$, $0 \leq G(a) \leq 256$, and $0 \leq B(a) \leq 256$;

and converts the YCbCr data to the R(d)G(d)B(d) with color converting functions that use an integer operation and are defined as follows:

$$R(d) = \left[ \frac{(16772821 \times Y + 22904709 \times Cr - 41320 \times Cb - 2926513792) \times 2 + 16772821}{16772821 \times 2} \right]$$

$$G(d) = \left[ \frac{(470873 \times Y - 329527 \times Cr - 157064 \times Cb + 62283648) \times 2 + 470873}{470873 \times 2} \right]$$

$$B(d) = \left[ \frac{(16772821 \times Y - 102267 \times Cr + 29047960 \times Cb - 3705048704) \times 2 + 16772821}{16772821 \times 2} \right]$$

and wherein the backward transformation is conducted from the R(d)G(d)B(d) data to the Y'Cb'Cr' data is conducted with color converting functions that use an integer operation and are defined as follows:

$$Y' = \left\lfloor \frac{77 \times R(d) + 150 \times G(d) + 29 \times B(d) + 128}{256} \right\rfloor$$

$$Cb' = \left\lfloor \frac{-44 \times R(d) - 87 \times G(d) + 131 \times B(d) + 128 \times 256 + 128}{256} \right\rfloor$$

$$Cr' = \left\lfloor \frac{131 \times R(d) - 110 \times G(d) - 21 \times B(d) + 128 \times 256 + 128}{256} \right\rfloor.$$

7. The computer-implemented method an claimed in claim 1, wherein the integer operation conducts the reversible conversion using powers of 2.

8. The computer-implemented method as claimed in claim 7, wherein the powers of 2 is conducted by bit shifts.

9. The computer-implemented method of claim 1 wherein the first data in the first color space are YCbCr data, and the second data in the second color space are RGB data, and the third data in the first color space are Y'Cb'Cr', and in a case of converting to the Y'Cb'Cr' data after the YCbCr data is converted into the RGB data, and further wherein the forward transformation transforms the RGB data to Y'Cb'CR' data using color converting functions having an integer operation and are defined as $$Y = \left\lfloor \frac{\begin{array}{c} 219 \times (299 \times R + 587 \times G + 114 \times B) + \\ 16 \times 255 \times 1000 + 255 \times 1000/2 \end{array}}{255 \times 1000} \right\rfloor \ast$$

$$Cb = \left\lfloor \frac{\begin{array}{c} 224 \times 564 \times (-299 \times R - 587 \times G + 886 \times B) + \\ 128 \times 255 \times 1000 \times 1000 + 255 \times 1000 \times 1000/2 \end{array}}{255 \times 1000 \times 1000} \right\rfloor$$

$$Cr = \left\lfloor \frac{\begin{array}{c} 224 \times 713 \times (701 \times R - 587 \times G - 114 \times B) + \\ 128 \times 255 \times 1000 \times 1000 + 255 \times 1000 \times 1000/2 \end{array}}{255 \times 1000 \times 1000} \right\rfloor$$

※⌊⌋: round a fractional part and the same in the following and wherein the backward transformation transforms the RGB data to YCbCr data using color converting functions that use an integer operation and are defined as $$R = \left\lfloor \frac{[219 \times 1000 \times (Cr - 128) + 713 \times 224 \times (Y - 16)] \times 255 + 713 \times 224 \times 219/2}{713 \times 224 \times 219} \right\rfloor$$

$$G = \left\lfloor \frac{\left[\begin{array}{c} 713 \times 224 \times 587 \times 564(Y - 16) - \\ 299 \times 219 \times 564 \times 1000 \times (Cr - 128) - \\ 114 \times 219 \times 713 \times 1000 \times (Cb - 128) \end{array}\right] \times 255 + 219 \times 713 \times 224 \times 587 \times 564/2}{219 \times 713 \times 224 \times 587 \times 564} \right\rfloor$$

$$B = \left\lfloor \frac{[219 \times 1000 \times (Cb - 128) + 564 \times 224 \times (Y - 16)] \times 255 + 564 \times 224 \times 219/2}{564 \times 224 \times 219} \right\rfloor.$$

10. A computer-implemented method for reversibly converting a data format as part of a coding and decoding process that includes compression, the computer-implemented method comprising:

performing a forward transformation and performing a backward transformation reciprocally on data being transformed between unit systems having different resolution levels defined by a brightness and a color difference, the forward transformation being performed prior to performing the compression, wherein in the forward transformation and the backward transformation, a first unit system having a lower resolution level is used as a common unit system, and the method further comprising performing a reversible data conversion with use of an integer operation for data in the first unit system and data in a second unit system having a higher resolution level higher than the first unit system, wherein the first unit system is for a first color space and the second unit system is for a second color space that is based on three primary colors of lights, the first color space being different than the second color space, and further wherein performing the reversible data conversion comprises determining each component value of one of the first and second color spaces during data conversion in at least one of the forward and backward transformations based on all of the component values of the other of the first and second color spaces;

wherein the first unit system is a first color space, and the second unit system is a second color space having the higher resolution level, and further wherein the coding and decoding process includes controlling an original color based on the brightness and the color difference, and by using the first color space as the common unit system, the reversible data conversion is performed by the integer operation, so that the backward transformation to transform first data in the first color space to second data in the second color space and the forward transformation to transform the second data in the second color space to third data in the first color space are conducted, where the first data corresponds to the third data.

11. The computer-implemented method defined in claim 10 wherein the first data in the first color space are Y(o)Cb(o)Cr(o) data, the second data in the second color space are R(o)G(o)B(o) data, and the third data in the first color space are Y(o)'Cb(o)'Cr(o)', and when converting to the Y(o)'Cb(o)'Cr(o)' data after the Y(o)Cb(o)Cr(o) data is converted into the R(o)G(o)B(o) data, the forward transformation is conducted from the RGB data to the Y(o)'Cb(o)'CR(o)' data using color converting functions that use an integer operation and are defined as $$Y(o) = \left\lfloor \frac{2 \times (x_M \times R(o) + (D - x_M - y_M) \times G(o) + y_M \times B(o)) + D}{2 \times D} \right\rfloor$$

$$Cb(o) = \left\lfloor \frac{\left\lfloor \frac{MAX_{RGB}+1}{2} \right\rfloor \times 2 \times (D - y_M) - x_M \times R(o) - (D - x_M - y_M) \times G(o) + (D - y_M) \times (B(o) + 1)}{2 \times (D - y_M)} \right\rfloor - \left\lfloor \frac{MAX_{RGB}+1}{2} \right\rfloor$$

$$Cr(o) = \left\lfloor \frac{\left\lfloor \frac{MAX_{RGB}+1}{2} \right\rfloor \times 2 \times (D - x_M) + (D - x_M) \times (R(o) + 1) - (D - x_M - y_M) \times G(o) - y_M \times B(o)}{2 \times (D - x_M)} \right\rfloor -$$

$$\left\lfloor \frac{MAX_{RGB}+1}{2} \right\rfloor,$$

where $X_M, Y_M$, and D are all integers, and where $0 \leq X_M < D$, $0 \leq X_M < D$, and $X_M + Y_M < D$;

the backward transformation is conducted from the R(o)G(o)B(o) data to the Y(o)Cb(o)Cr(o) data using color converting functions that use an integer operation and are defined as $$R(o) = \left\lfloor \frac{2 \times (D \times Y(o) + 2 \times (D - x_M) \times Cr(o)) + D}{2 \times D} \right\rfloor$$

$$G(o) = \left\lfloor \frac{\begin{pmatrix} (2 \times ((D - x_M - y_M) \times D \times Y(o) - \\ 2 \times y_M \times (D - y_M) \times Cb(o) - 2 \times x_M \times \\ (D - x_M) \times Cr(o)) + (D - x_M - y_M) \times D \end{pmatrix}}{2 \times (D - x_M - y_M) \times D} \right\rfloor$$

$$B(o) = \left\lfloor \frac{2 \times (D \times Y(o) + 2 \times (D - y_M) \times Cb(o)) + D}{2 \times D} \right\rfloor.$$

12. The computer-implemented method as claimed in claim 10, wherein a color conversion for the original color based on the brightness and the color difference, the first data in the first color space are Y(o)Cb(o)Cr(o) data, the second data in the second color space are R(o)G(o)B(o) data, and the third data in the first color space are Y(o)'Cb(o)'Cr(o)', and in a case of converting to the Y(o)'Cb(o)'Cr(o)' data after the Y(o)Cb(o)Cr(o) data is converted into the R(o)G(o)B(o) data, the forward transformation is conducted from the RGB data to the Y(o)'Cb(o)'CR(o)' data using color converting functions that use an integer operation and are defined as $$Y(o) = \left\lfloor \frac{(299 \times R(o) + 587 \times G(o) + 114 \times B(o)) + 500}{1000} \right\rfloor$$

$$Cb(o) = \left\lfloor \frac{128 \times 2 \times 886 - 299 \times R(o) - 587 \times G(o) + 886 \times (B(o) + 1)}{2 \times 886} \right\rfloor - 128$$

$$Cr(o) = \left\lfloor \frac{128 \times 2 \times 701 + 701 \times (R(o) + 1) - 587 \times G(o) - 114 \times B(o)}{2 \times 701} \right\rfloor - 128$$

and the backward transformation is conducted from the R(o)G(o)B(o) data to the Y(o)Cb(o)Cr(o) data using color converting functions that use an integer operation and are defined as $$R(o) = \left\lfloor \frac{(1000 \times Y(o) + 1402 \times Cr(o)) + 500}{1000} \right\rfloor$$

$$G(o) = \left\lfloor \frac{\begin{matrix} 587 \times 1000 \times Y(o) - 2 \times 114 \times 886 \times Cb(o) - \\ 2 \times 299 \times 701 \times Cr(o)) + 587 \times 500 \end{matrix}}{587 \times 1000} \right\rfloor$$

$$B(o) = \left\lfloor \frac{(1000 \times Y(o) + 1772 \times Cb(o)) + 500}{1000} \right\rfloor.$$

13. A computer-implemented method for reversibly converting a data format as part of a coding and decoding process that includes compression, the method comprising:

performing a forward transformation and performing a backward transformation reciprocally on data being transformed between unit systems having different resolution levels defined by a brightness and a color difference, the forward transformation being performed prior to performing the compression, wherein in the forward transformation and the backward transformation, a first unit system having a lower resolution level is used as a common unit system, and the method further comprising performing a reversible data conversion with use of an integer operation for data in the first unit system and data in a second unit system having a higher resolution level higher than the first unit system, wherein the first unit system is a BMU unit system using an inch unit system and the second unit system is a $\frac{1}{100}$ mm unit system using a meter unit system, and by using the first color space as the common unit system, the reversible data conversion is performed by the integer operation, so that the backward transformation to transform first data in the first color space to second data in the second color space and the forward transformation to transform the second data in the second color space to third data in the first color space are conducted, where the first data corresponds to the third data, and further wherein performing the reversible data conversion comprises determining each component value of one of the first and second color spaces during data conversion in at least one of the forward and backward transformations is based on all of the component values of the other of the first and second color spaces.

14. An apparatus for reversibly converting a data format as part of a coding and decoding process, the apparatus comprising a coding unit and a decoding unit, the coding unit and decoding unit performing a forward transformation and a backward transformation reciprocally on data between unit systems having different resolution levels defined by a brightness and a color difference, the apparatus further comprising a data format reversibly converting unit for reversibly converting a data format, wherein in the forward transformation and the backward transformation, a first unit system having a lower resolution level is used as a common unit system, and wherein a reversible data conversion is performed with use of an integer operation for data in the first unit system and data in a second unit system having a higher resolution level higher than the first unit system, wherein the data format reversibly converting unit performs the reversible data conversion, wherein the first unit system is for a first color space and the second unit system is for a second color space that is based on three primary colors of lights, the first color space being different than the second color space and the first color space having the lower resolution level and the second color space having the higher resolution level, and further wherein the reversible data conversion determines determining each component value of one of the first and second color spaces during data conversion in at least one of the forward and backward transformations is based on all of the component values of the other of the first and second color spaces, and by using the first color space as the common unit system, the reversible data conversion is performed by the integer operation, so that the backward transformation to transform first data in the first color space to second data in the second color space and the forward transformation to transform the second data in the second color space to third data in the first color space are conducted, where the first data corresponds to the third data.

15. The apparatus as claimed in claim 14, wherein the data format reversibly converting unit performs a digital color conversion by quantizing analog data in the first color space, and by using the first color space as the common unit system.

16. The apparatus as claimed in claim 14, a color conversion in accordance with an international standard in which the data format for converting an analog video signal into digital data is specified.

17. An apparatus for reversibly converting a data format as part of a coding and decoding process, the apparatus comprising a coding unit and a decoding unit, the coding unit and decoding unit performing a forward transformation and a backward transformation reciprocally on data between unit systems having different resolution levels defined by a brightness and a color difference, the apparatus further comprising a data format reversibly converting unit for reversibly converting a data format, wherein in the forward transformation and the backward transformation, a first unit system having a lower resolution level is used as a common unit system, and wherein a reversible data conversion is performed with use of an integer operation for data in the first unit system and data in a second unit system having a higher resolution level higher than the first unit system, wherein the data format reversibly converting unit performs the reversible data conversion, and the first unit system is a first color space having the lower resolution level, and the second unit system is a second color space having the higher resolution level, wherein the first unit system is for a first color space and the second unit system is for a second color space that is based on three primary colors of lights, the first color space being different than the second color space, and further wherein the reversible data conversion determines each component value of one of the first and second color spaces during data conversion in at least one of the forward and backward transformations is based on all of the component values of the other of the first and second color spaces, an original color based on the brightness and the color difference, and by using the first color space as the common unit system, the reversible data conversion is performed by the integer operation, so that the backward transformation to transform first data in the first color space to second data in the second color space and the forward transformation to transform the second data in the second color space to third data in the first color space are conducted, where the first data corresponds to the third data.

18. A computer-implemented method for reversibly converting a data format as part of a coding and decoding process that includes compression, the computer-implemented method comprising:

performing a forward transformation and a backward transformation reciprocally on data between unit systems having different resolution levels, wherein in the forward transformation and the backward transformation, a first unit system having a lower resolution level is used as a common unit system, and the method further comprising performing a reversible data conversion with use of an integer operation for data in the first unit system and data in a second unit system having a higher resolution level higher than the first unit system, wherein the data format reversibly converting part conducts the reversible data conversion in that the first unit system is a BMU unit system using an inch unit system and the second unit system is a 1/100 mm unit system using a meter unit system, and by using the first color space as the common unit system, the reversible data conversion is performed by the integer operation, so that the backward transformation to transform first data in the first color space to second data in the second color space and the forward transformation to transform the second data in the second color space to third data in the first color space are conducted and the first data corresponds to the third data, and further wherein performing a reversible data conversion comprises determining each component value of one of the first and second color spaces during data conversion in at least one of the forward and backward transformations i-s based on all of the component values of the other of the first and second color spaces.

19. A computer-readable medium embodied with program code to cause a computer to perform a method for reversibly transforming a data format as part of a coding and decoding process that includes compression, the method comprising performing a forward transformation and a backward transformation reciprocally on data between unit systems having different resolution levels defined by a brightness and a color difference, wherein in the forward transformation and the backward transformation, a first unit system having a lower resolution level is used as a common unit system, and the method further comprising performing a reversible data conversion with use of an integer operation for data in the first unit system and data in a second unit system having a higher resolution level higher than the first unit system, wherein the first unit system is for a first color space and the second unit system is for a second color space that is based on three primary colors of lights, the first color space being different than the second color space, and further wherein performing the reversible data conversion comprises determining each component value of one of the first and second color spaces during data conversion in at least one of the forward and backward transformations based on all of the component values of the other of the first and second color spaces, and by using the first color space as the common unit system, the reversible data conversion is performed by the integer operation, so that the backward transformation to transform first data in the first color space to second data in the second color space and the forward transformation to transform the second data in the second color space to third data in the first color space are conducted, where the first data corresponds to the third data.

* * * * *